US006728868B2

(12) United States Patent
Arnold et al.

(10) Patent No.: US 6,728,868 B2
(45) Date of Patent: Apr. 27, 2004

(54) SYSTEM AND METHOD FOR COALESCING DATA UTILIZED TO DETECT DATA HAZARDS

(75) Inventors: Ronny Lee Arnold, Ft Collins, CO (US); Donald Charles Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/282,183

(22) Filed: Oct. 28, 2002

(65) Prior Publication Data

US 2003/0051121 A1 Mar. 13, 2003

Related U.S. Application Data

(63) Continuation of application No. 09/493,504, filed on Jan. 28, 2000, now Pat. No. 6,490,674.

(51) Int. Cl.[7] .................................................. G06F 9/34
(52) U.S. Cl. ...................................... 712/216; 712/218
(58) Field of Search .............................. 712/216, 218, 712/232

(56) References Cited

U.S. PATENT DOCUMENTS

| 860,017 | A | | 7/1907 | Sharangpani et al. | |
|---|---|---|---|---|---|
| 5,006,980 | A | * | 4/1991 | Sanders et al. | 712/219 |
| 5,155,817 | A | * | 10/1992 | Kishigami et al. | 712/218 |
| 5,276,683 | A | | 1/1994 | Ohkubo | |
| 5,778,248 | A | * | 7/1998 | Leung | 712/23 |
| 5,859,999 | A | | 1/1999 | Morris et al. | |
| 5,933,651 | A | * | 8/1999 | Masuda et al. | 712/42 |
| 6,219,781 | B1 | | 4/2001 | Arora | |
| 6,304,955 | B1 | * | 10/2001 | Arora | 712/217 |
| 6,374,323 | B1 | | 4/2002 | Stracousky et al. | |
| 6,401,195 | B1 | * | 6/2002 | Arora et al. | 712/218 |
| 6,430,642 | B1 | | 8/2002 | Stracousky et al. | |
| 6,438,681 | B1 | | 8/2002 | Arnold et al. | |

OTHER PUBLICATIONS

Alexander Wolfe, "Patents Shed Light on Merced: Techniques of Predication and Speculation Detailed," Electronic Engineering Times, Feb. 15, 1999, pp. 43–44.

Patterson, et al., "Computer Architechture: A Quantitative Approach," Morgan Kaugmann Publishers, Inc., 2ed, pp. 150–154 and 191–193.

Gary Lauterbach, "Sun's Next–Generation High–End SPARC Microprocessor," Microprocessor Forum, Oct. 14–15, 1997, pp. 3–6.

* cited by examiner

Primary Examiner—Eric Coleman

(57) ABSTRACT

The present invention generally relates to a processing system and method for coalescing instruction data to efficiently detect data hazards between instructions of a computer program. In architecture, the system of the present invention utilizes a plurality of pipelines, coalescing circuitry, and hazard detection circuitry. The plurality of pipelines is configured to process instructions of a computer program, and the coalescing circuitry is configured to receive, from the pipelines, a plurality of register identifiers identifying a plurality of registers. The coalescing circuitry is configured to coalesce said register identifiers thereby generating a coalesced register identifier identifying each of said plurality of registers. The hazard detection circuitry is configured to receive the coalesced register identifier and to perform a comparison of the coalesced register identifier with other information received from the pipelines. The hazard detection circuitry is further configured to detect a data hazard based on the comparison.

14 Claims, 20 Drawing Sheets

SYSTEM AND METHOD FOR COALESCING DATA UTILIZED TO DETECT DATA HAZARDS

This is a continuation of application Ser. No. 09/493,504 filed Jan. 28, 2000, now U.S. Pat. No. 6,490,674.

BACKGROUND OF THE INVENTION

1. Field of the Invention

The present invention generally relates to data processing techniques and, in particular, to a system and method for producing data indicative of data hazards between instructions of a computer program and for coalescing the data to minimize the circuitry and complexity required to detect the data hazards.

2. Related Art

To increase the performance of many processors, pipeline processing has been developed. In pipeline processing, a processor is equipped with at least one pipeline that can simultaneously process multiple instructions. Therefore, execution of one instruction in the pipeline may be commenced before the results of execution of a preceding instruction in the pipeline are available, and as a result, errors from data dependency hazards are possible.

A data dependency exists when one instruction to be executed by a pipeline utilizes data produced via execution of another instruction, and the data dependency creates a data dependency hazard when the data produced by the other instruction is not yet available for use by the one instruction. For example, a later instruction, when executed, may utilize data that is produced by execution of an earlier instruction (e.g., a later add instruction may utilize data that is retrieved by an earlier load instruction). If the later instruction executes before the data from execution of the earlier instruction is available, then the later instruction utilizes incorrect data, resulting in a data dependency error. Accordingly, a data dependency hazard exists between the two instructions, until the data utilized by the later instruction is available or until the data dependency error occurs.

Needless to say, it is important to detect data dependency hazards so that data dependency errors can be prevented. However, circuitry for detecting data dependency hazards is often complex and often utilizes a relatively large amount of area within a processor. This is especially true in superscalar processors, which include a plurality of pipelines that simultaneously execute instructions. In this regard, an instruction in one pipeline may not only have a dependency with another instruction in the same pipeline but may also have a dependency with another instruction in another pipeline. Therefore, to adequately check for data dependency hazards, a first instruction in one pipeline should be compared with each instruction in each pipeline that could share a data dependency hazard with the first instruction. Consequently, as the number of pipelines within a processor increases, the circuitry and complexity required to detect data dependencies that define data dependency hazards increase dramatically.

Thus, a heretofore unaddressed need exists in the industry for an efficient processing system with minimal complexity and circuitry for detecting data hazards between instructions of a computer program.

SUMMARY OF THE INVENTION

The present invention overcomes the inadequacies and deficiencies of the prior art as discussed hereinbefore. Generally, the present invention provides a processing system and method for coalescing instruction data to efficiently detect data hazards between instructions of a computer program.

In architecture, the system of the present invention utilizes a plurality of pipelines, coalescing circuitry, and hazard detection circuitry. The plurality of pipelines are configured to process instructions of a computer program, and the coalescing circuitry is configured to receive, from the pipelines, a plurality of register identifiers identifying a plurality of registers. The coalescing circuitry is configured to coalesce said register identifiers thereby generating a coalesced register identifier identifying each of said plurality of registers. The hazard detection circuitry is configured to receive the coalesced register identifier and to perform a comparison of the coalesced register identifier with other information received from the pipelines. The hazard detection circuitry is further configured to detect a data hazard based on the comparison.

The present invention can also be viewed as providing a method that can be broadly conceptualized by the following steps: simultaneously processing, via a plurality of pipelines, instructions of a computer program; receiving a plurality of register identifiers associated with the instructions, the register identifiers identifying a plurality of registers; coalescing the register identifiers thereby generating a coalesced register identifier identifying each of the plurality of registers; comparing the coalesced register identifier to another register identifier identifying at least one register; and detecting a data hazard based on the comparing step Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
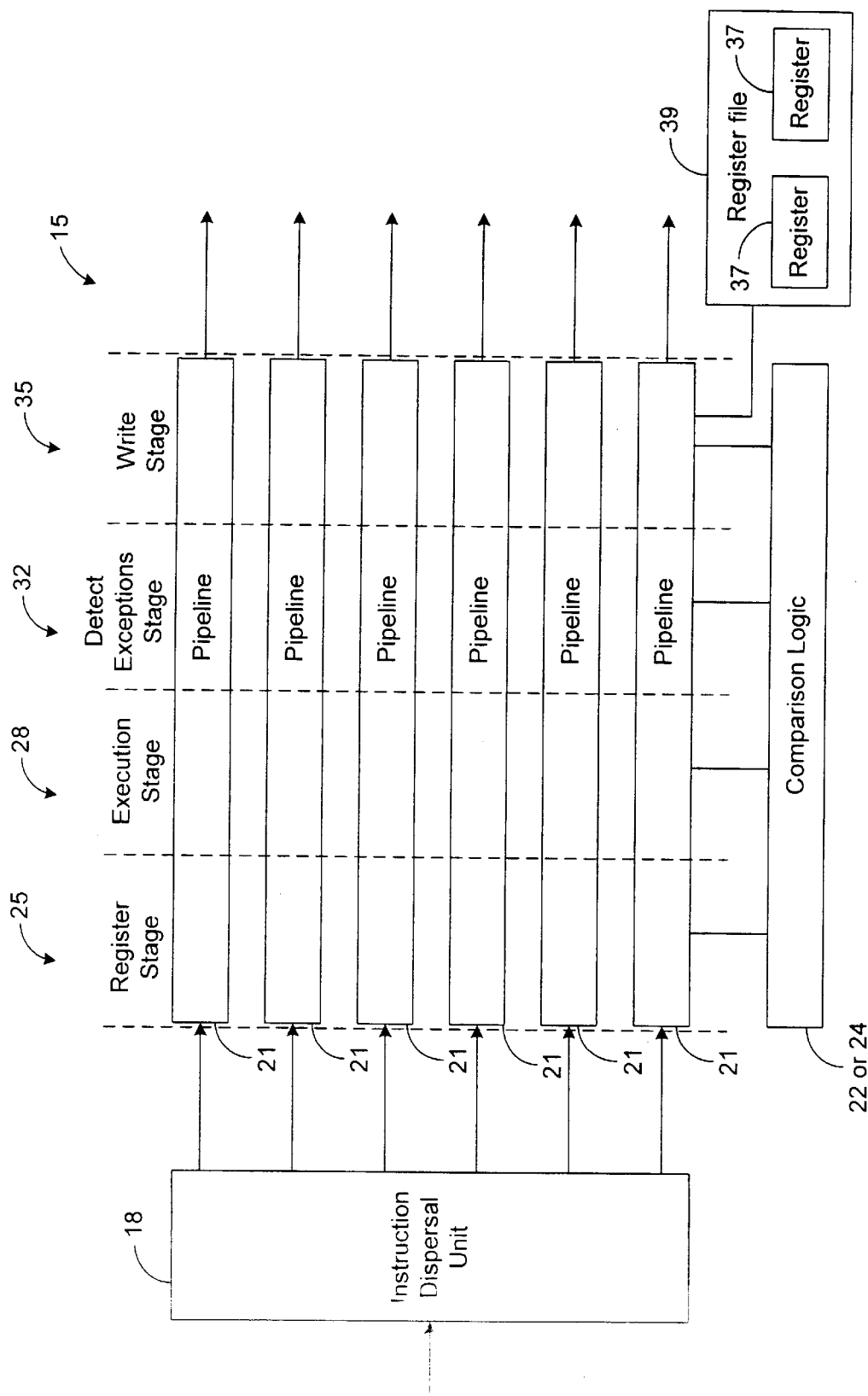
FIG. 1 is a block diagram illustrating a processing system in accordance with the prior art.

The present invention generally relates to a system and method for efficiently detecting data hazards within a processing system that executes instructions of a computer program so that errors from the data hazards can be prevented. To illustrate the principles of the present invention, refer to FIG. 1, which depicts a conventional superscalar processing system 15. The processing system 15 includes an instruction dispersal unit 18 that receives instructions of a computer program and assigns each instruction to one of a plurality of pipelines 21. Each pipeline 21 is configured to execute each instruction received by the pipeline 21.

Each pipeline 21 is usually configured to only process particular types of instructions (e.g., integer operation, floating-point operation, memory operation, etc.). Therefore, the instruction dispersal unit 18 is configured to assign each instruction only to a pipeline 21 compatible with the instruction. Furthermore, although comparison logic 22 or 24 is shown for simplicity as being coupled to one pipeline 21 in FIG. 1, it should be noted that each pipeline 21 is similarly coupled to comparison logic 22 or 24.

As shown by FIG. 1, pipelines 21 typically process instructions in stages. As used herein, a "stage" is any portion of a pipeline 21 that processes instructions and that includes a latch at its input so that the timing of the data input to the stage can be controlled in response to edges of a clock signal. The pipelines 21 shown by FIG. 1 process the instructions in four stages: a register stage 25, an execution stage 28, a detect exceptions stage 32, and a write stage 35. In other embodiments, it is possible for the processing system 15 to process instructions in other types and combinations of stages.

In the system 15 shown by FIG. 1, an instruction received by one of the pipelines 21 is first processed in the register stage 25. In the register stage 25, any operands necessary for the execution of the instruction are obtained. Once the operands have been obtained, the instruction enters the execution stage 28, which executes the instruction. After the instruction has been executed in the execution stage 28, the instruction enters a detect exceptions stage 32, which checks conditions, such as overruns during execution, for example, that may indicate data unreliability. After the detect exceptions stage 32 is completed, the instruction enters a write stage 35, which writes the results of the execution stage 28 to a register 37 within a register file 39 or to a memory location.

Typically, each stage 25, 28, 32, and 35 of the pipelines 21 processes only one instruction at a time, and the stages 25, 28, 32 and 35 may simultaneously process their respective instruction such that each pipeline 21 is capable of processing multiple instructions. For example, in the system 15 shown by FIG. 1, it is possible for one of the pipelines 21 to simultaneously process four instructions, in which each stage 25, 28, 32, and 35 of the pipeline 21 is processing one of the four instructions. Furthermore, each pipeline 21 may process instructions as other pipelines 21 are processing other instructions. Therefore, it is possible to simultaneously process a relatively large number of instructions via the system 15 shown by FIG. 1.

To control timing, the instructions are typically stepped through the stages 25, 28, 32, and 35 in response to edges of a clock signal. For example, an instruction in the write stage 35 may step out of a pipeline 21 on the same clock edge that instructions in the register stage 25, the execution stage 28, and the detect exceptions stage 32 respectively step into the execution stage 28, the detect exceptions stage 32, and the write stage 35 of the same pipeline 21. However, an instruction is typically prevented from stepping out of a stage 25, 28, 32, or 35 until the stage can completely process the instruction without data dependency errors.

In this regard, it is sometimes necessary to stall an instruction in a stage 25, 28, 32, or 35 when processing of the instruction in the stage 25, 28, 32, or 35 cannot complete without data dependency errors prior to the next active edge of the clock signal. For example, processing of instructions in the detect exceptions stage 32 and the write stage 35 may complete without data dependency errors, and the instructions in these stages 32 and 35 may then respectively step out of these stages 32 and 35 on the next edge of the clock signal. However, the instruction in the execution stage 28 of the same pipeline 21 may utilize data that is not available (e.g., that is still being retrieved by an earlier load instruction) prior to the occurrence of the next clock edge. Therefore, the instruction in the execution stage 28 is prevented from stepping out of the execution stage 28 on the next clock edge, since the processing of the instruction cannot be completed without errors prior to the occurrence of the next clock edge. In other words, the instruction in the execution stage 28 is stalled. This instruction should remain stalled until the execution stage 28 is able to completely process the instruction without data dependency errors. U.S. Patent Application entitled "Superscalar Processing System and Method for Efficiently Performing In-Order Processing of Instructions," assigned Ser. No. 09/390,199, and filed on Sep. 7, 1999, which is incorporated herein by reference, describes in more detail a suitable process of stalling instructions to prevent data dependency hazards.

Since each stage 25, 28, 32, and 35 is usually configured to process only one instruction at a time, the instruction in the register stage 25 of the same pipeline 21 in the foregoing example should also be stalled in the register stage 25 until at least the instruction in the execution stage 28 is allowed to step out of the execution stage 28. Therefore, when an instruction is stalled in one of the stages 25, 28, 32, or 35, each later instruction being processed by the same pipeline 21 should also be stalled, even if the later instruction is otherwise ready to step into the next stage 28, 32, or 35.

As the instructions are stepped through the pipelines 21, it is desirable to detect data dependency hazards so that data dependency errors can be prevented, usually by stalling at least one of the instructions. A data dependency hazard is usually detected by detecting a data dependency and by determining that the data associated with the data dependency is not yet available. Therefore, to detect whether or not a data dependency hazard exists between two instructions, the following determinations are usually made: 1) whether a data dependency exists between the two instructions and 2) whether the data associated with the data dependency (i.e., the data produced by one of the instructions and utilized by the other instruction) is available.

A data dependency between two instructions is usually detected by comparing register identifiers associated with the instructions. In this regard, each instruction usually includes at least one register identifier that indicates which register 37 is to be used by the instruction. For example, an instruction (referred to as a "producer") that produces (e.g. writes) data includes a register identifier that identifies the register where data should be written when the producer is executed, and an instruction (referred to as a "consumer") that utilizes (e.g., retrieves) stored data or data produced by a producer includes a register identifier that identifies the register 37 where data should be retrieved from when the consumer is executed. If a later stage 28, 32, or 35 in one of the pipelines 21 is processing a producer having the same register identifier as a consumer being processed by an earlier stage 25, 28, or 32, then a data dependency exists between the two instructions. Furthermore, if the data produced by the producer and used by the consumer is not yet available to the consumer, then the data dependency between the two instructions creates a data dependency hazard.

For the purposes of this document, a stage is "later" than another stage if an instruction is processed by the stage after the instruction has been processed by the other stage. For example, in FIG. 1, the execution stage 28 is later than the register stage 25, and the register stage 25 is earlier than the execution stage 28.

It should be noted that most instructions are both consumers and producers in that they both retrieve data and store data when executed. As used herein, the register identifier of an instruction referred to as a "producer" identifies a register 37 where the instruction stores data, even though the instruction may retrieve data from another register 37 and, therefore, be associated with another register identifier. Furthermore, the register identifier of an instruction referred to as a "consumer" identifies a register 37 where the instruction retrieves data, even though the instruction may store data in another register 37 and, therefore, be associated with another register identifier.

Since operands for consumers are obtained in the register stage 25, the register identifiers of each consumer in the register stage 25 are usually compared to the register identifiers of each producer in the later stages 28, 32, and 35 to determine whether any data dependencies that create data dependency hazards exist with the consumers in the register stage 25. To enable such comparisons of the register identifiers, the register identifier associated with each instruction is sometimes stepped through the pipelines 21 along with the instruction.

Figure 2:
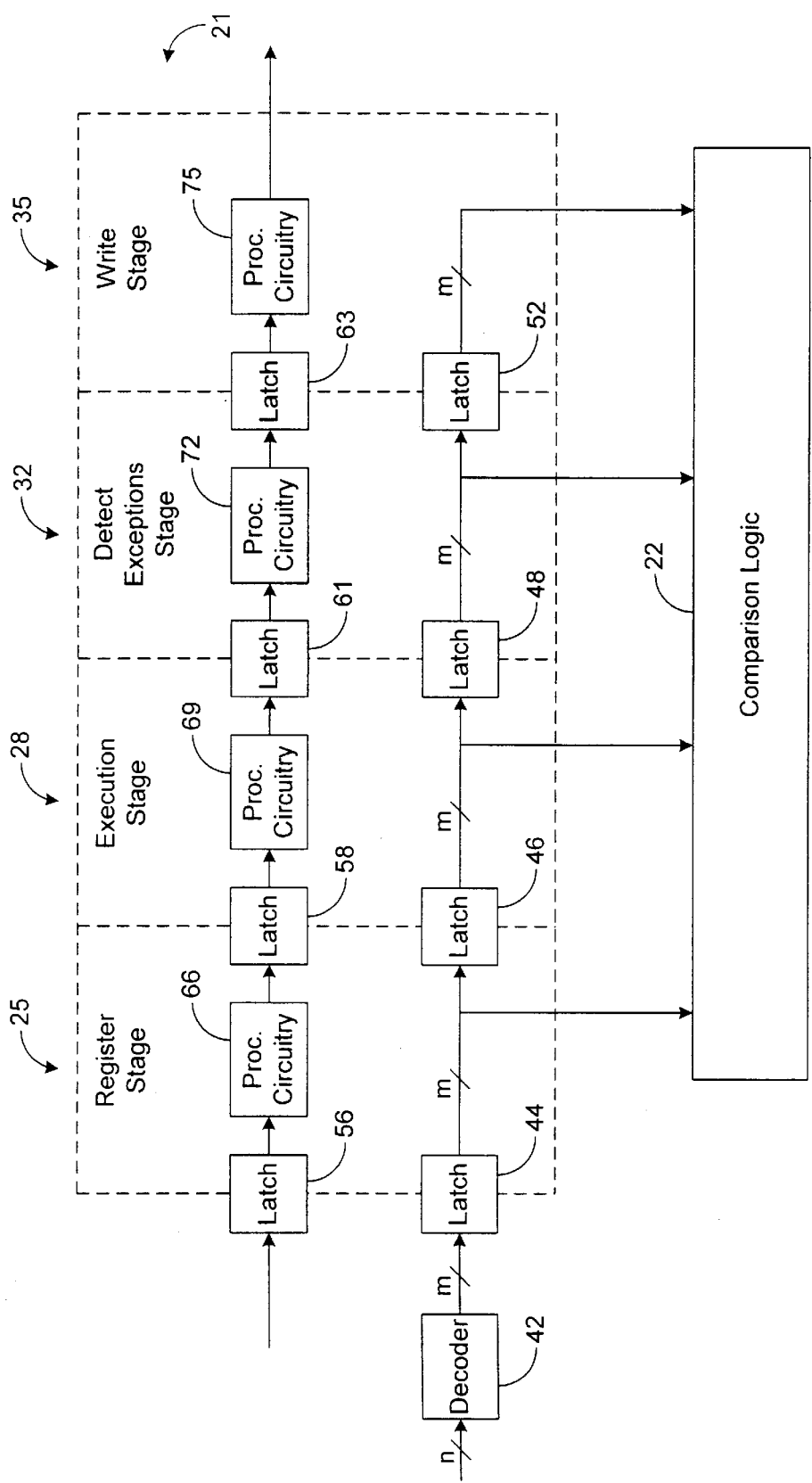
FIG. 2 is a block diagram illustrating a more detailed view of a pipeline depicted in FIG. 1.

In this regard, the register identifier, which is usually an n-bit encoded value, is first decoded into an m-bit value (where m is usually $2^n$) by a decoder 42, as shown by the conventional system of FIG. 2. The value m corresponds to the number of registers 37 associated with the system 15, and each bit in the m-bit register identifier corresponds to a particular register 37. The decoder 42 is configured to determine which register 37 is identified by the n-bit register identifier and to assert the bit in the m-bit register identifier that corresponds to the identified register 37. The remaining bits in the m-bit register identifier are deasserted. Therefore, the m-bit register identifier identifies one of the registers, when the bit associated with the one register 37 is asserted.

The m-bit register identifier is respectively latched into stages 25, 28, 32, and 35 by latches 44, 46, 48, and 52 on the same edges that the instruction associated with the register identifier is respectively latched into stages 25, 28, 32, and 35 by latches 56, 58, 61, and 63. Therefore, the register identifier and its associated instruction should be in the same stage 25, 28, 32, or 35 at the same time. As shown by FIG. 2, the instruction associated with the register identifier is respectively processed by processing circuitry 66, 69, 72, and 75 once the instruction is respectively latched into the stages 25, 28, 32, and 35. The processing circuitry 66, 69, 72, and 75 respectively perform the functionality described hereinbefore for the stages 25, 28, 32, and 35. In this regard, the processing circuitry 66 obtains operands, the processing circuitry 69 executes the instruction, the processing circuitry 72 checks for exceptions, and the processing circuitry 75 writes data produced via execution of the instruction into a register 37 or location in memory.

The n-bit register identifiers in the stages 25, 28, 32, and 35 are transmitted to comparison logic 22, which is configured to compare the m-bit register identifiers to determine whether a data dependency exists between any of the instructions associated with the m-bit register identifiers. In this regard, to determine whether a consumer in the register stage 25 has a data dependency with any of the producers in the later stages 28, 32, and 35, the comparison logic 22 compares the m-bit register identifier of the consumer in the register stage 25 with each of the m-bit register identifiers of the producers in the execution stage 28, the detect exceptions stage 32, and the write stage 35. If any of the compared m-bit register identifiers of the producers in any of the stages 28, 32, or 35 matches the m-bit register identifier of the consumer in the register stage 25, then the comparison logic 22 determines that a data dependency exists between the instructions associated with the two matching register identifiers. Furthermore, if the data produced by one of the instructions in stages 28, 32, or 35 that has a data dependency with the consumer in the register stage 25 is not yet available for use by the consumer in the register stage 25, then the comparison logic 22 determines that a data dependency hazard exists between the two instructions.

Figure 3:
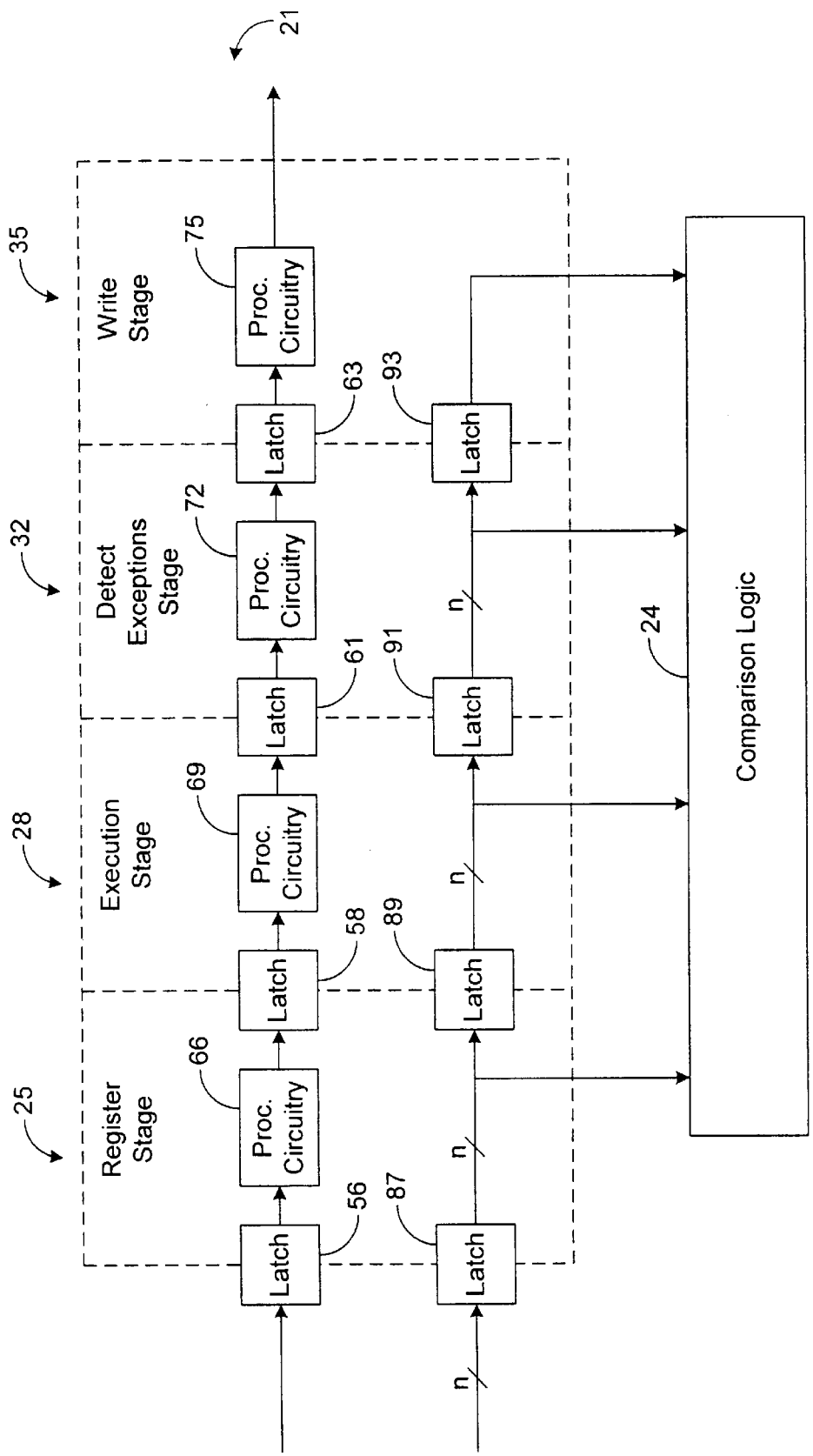
FIG. 3 is a block diagram illustrating another embodiment of the pipeline depicted in FIG. 2.

FIG. 3 shows another embodiment of circuitry that is conventionally used to process instructions in one of the pipelines 21 and to check for data dependencies that create data dependency hazards. The instruction associated with an n-bit encoded register identifier is latched into stages 25, 28, 32, and 35 and processed by processing circuitry 66, 69, 72, and 75, as described above. However, the n-bit register identifier is not decoded by a decoder 42 (FIG. 2). Instead, the n-bit register identifier is latched into stages 25, 28, 32, and 35 by latches 87, 89, 91, and 93, respectively, on the same edges that the instruction is respectively latched into stages 25, 28, 32, and 35. Therefore, the n-bit register identifier steps through the stages 25, 28, 32, and 35 along with the instruction associated with the n-bit register identifier.

The n-bit register identifier in each stage 25, 28, 32, and 35 is transmitted to comparison logic 24, which is configured to compare the register identifiers to determine whether a data dependency that defines a data dependency hazard exists between any of the instructions associated with the n-bit register identifiers. In this regard, to determine whether a consumer in the register stage 25 has a data dependency with any of the producers in the later stages 28, 32, and/or 35, the comparison logic 24 compares the n-bit register identifier of the consumer in the register stage 25 with each of the n-bit register identifiers of producers in the execution stage 28, the detect exceptions stage 32, and the write stage 35. Since the n-bit register identifiers are encoded, the comparison logic 24 uses n-bit comparators to determine whether the register identifier in the register stage 25 matches any of the register identifiers in the stages 28, 32, and/or 35. If any of the compared n-bit register identifiers of the producers in any of the stages 28, 32, or 35 matches the n-bit register identifier of the consumer in the register stage 25, then the comparison logic 24 determines that a data dependency exists between the instructions associated with the two matching register identifiers. Furthermore, if the data produced by one of the instructions in stages 28, 32, or 35 that has a data dependency with the consumer in the register stage 25 is not yet available for use by the consumer in the register stage 25, then the comparison logic 24 determines that a data dependency hazard exists between the two instructions.

It should be noted that, for simplicity, the circuitry depicted by FIG. 2 and FIG. 3 steps only register identifiers of instructions in a single pipeline 21 through the stages 25, 28, 32, and 35. Furthermore, the aforementioned circuitry processes only a single register identifier for each instruction processed by the pipeline 21. Since many instructions include more than one register identifier, additional circuitry should be implemented as necessary to handle multiple register identifiers for the same instruction. Furthermore, the register identifier of the consumer in the register stage 25 should not only be compared with the register identifiers of the producers in the stages 28, 32, and/or 35 in the same pipeline 21 but should also be compared with the register identifiers of each producer in any of the later stages 28, 32, and/or 35 of any of the other pipelines 21. Therefore, as the number of pipelines 21 increases, the wiring and other circuitry for detecting data dependency hazards increase dramatically.

In particular, given that the amount of latency required for data produced by producers to become available to consumers is neither uniform nor constant, the circuitry required for detecting data dependency hazards and for preventing data dependency errors is relatively complex. Furthermore, in FIG. 2, the number (m) of registers 37 is usually relatively large for higher performance processing systems 15. Therefore, the number of wires needed to latch the m-bit register identifier into each stage 25, 28, 32, and 35 (i.e., to transmit the m-bit register identifier from stage-to-stage) is relatively large (e.g., in the hundreds). This additional wiring utilizes valuable space within the processing system 15 and further complicates the overall wiring design of the system 15.

In addition, the n-bit comparators (including the wiring for the n-bit comparators) for comparing the encoded register identifiers in FIG. 3 also utilize valuable space within the processing system 15 and increase the complexity of the wiring design of the system 15. Furthermore, separately latching the m-bit register identifiers and the instructions associated with the register identifiers through the stages 25, 28, 32, and 35 increases the number of latches and, therefore, the amount of circuitry and space required to implement the system 15. The problems relating to complexity and space are exacerbated as the number of pipelines 21 increases.

Figure 4:
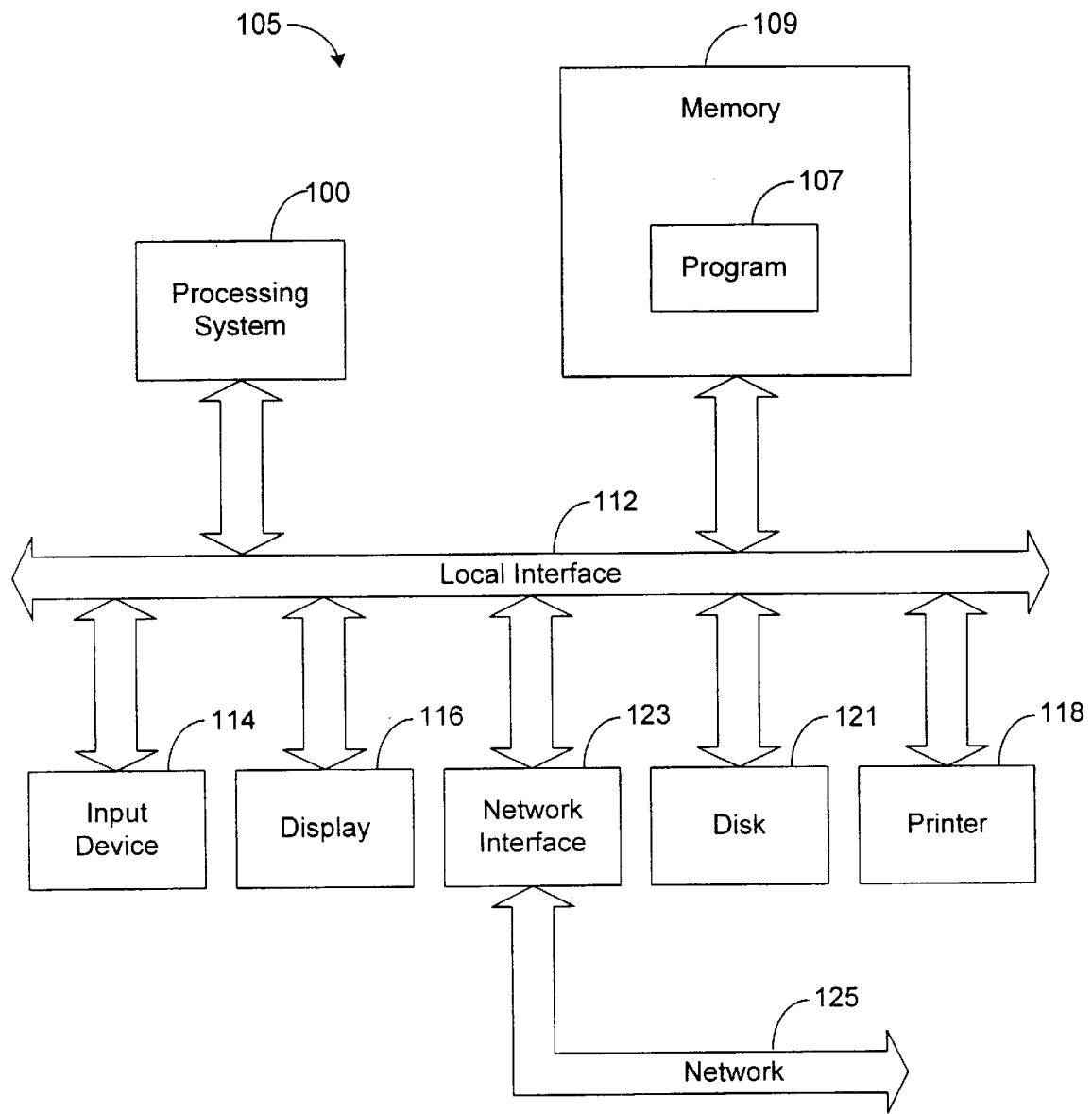
FIG. 4 is a block diagram illustrating a computer system that employs a processing system in accordance with the principles of the present invention.

In general, the present invention provides a system and method that efficiently detects data dependency hazards. FIG. 4 depicts a processing system 100 that may be utilized to implement the present invention. As shown by FIG. 4, the processing system 100 may be employed within a computer system 105 for executing instructions from a computer program 107 that is stored in memory 109.

The processing system 100 communicates to and drives the other elements within the system 105 via a local interface 112, which can include one or more buses. Furthermore, an input device 114, for example, a keyboard or a mouse, can be used to input data from a user of the system 105, and screen display 116 or a printer 118 can be used to output data to the user. A disk storage mechanism 121 can be connected to the local interface 112 to transfer data to and from a nonvolatile disk (e.g., magnetic, optical, etc.). The system 105 can be connected to a network interface 123 that allows the system 105 to exchange data with a network 125.

Figure 5:
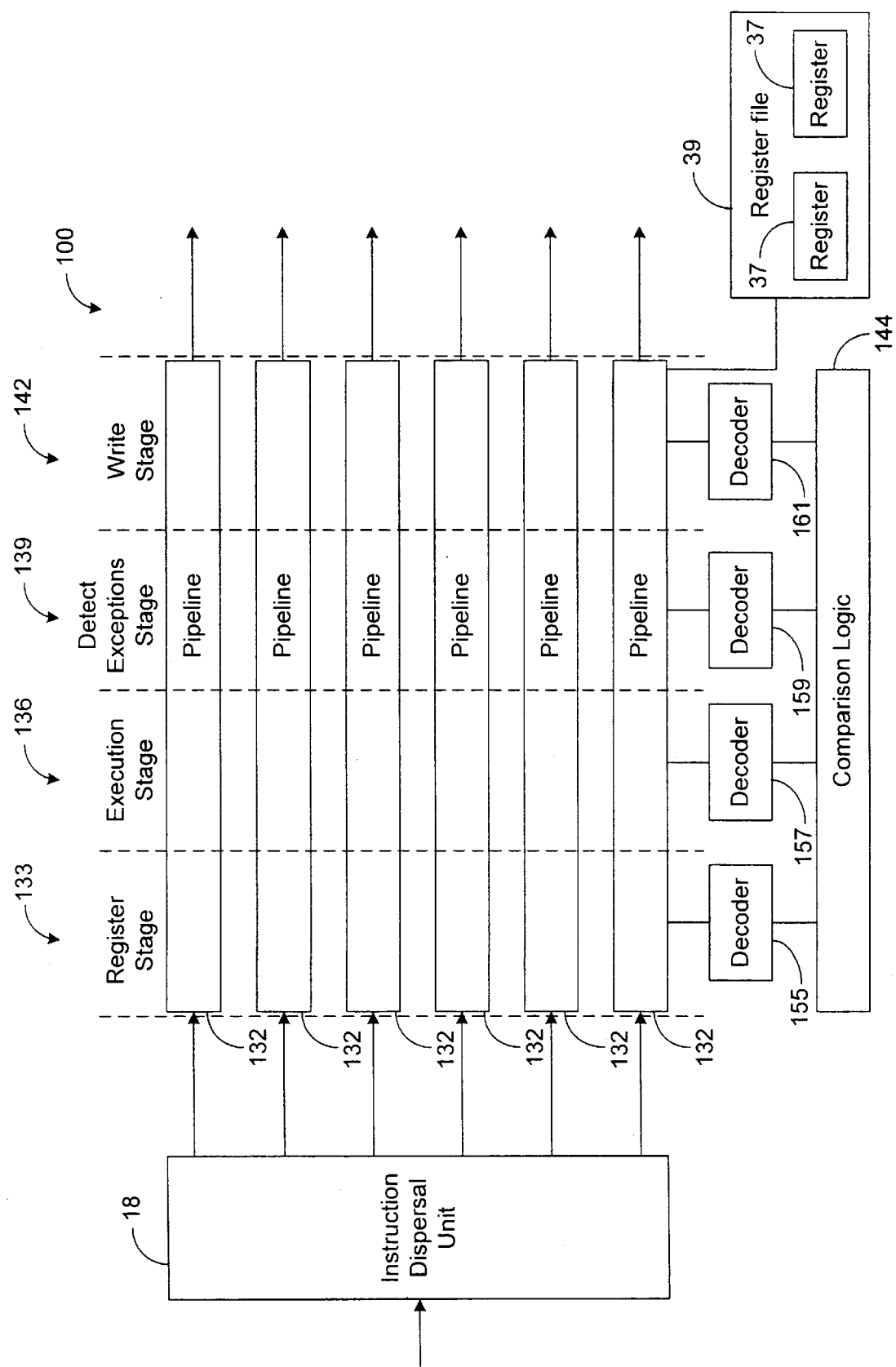
FIG. 5 is a block diagram illustrating the processing system depicted in FIG. 4.

Other than the circuitry for detecting data dependencies and, therefore, data dependency hazards, the configuration of the processing system 100 is preferably the same as the configuration of conventional processing system 15. Therefore, as shown by FIG. 5, the processing system 100 processes instructions via pipelines 132 in a register stage 133, an execution stage 136, a detect exceptions stage 139, and a write stage 142, as described hereinbefore for the conventional system 15. Note that it is possible to divide the processing performed by the pipelines 132 via other stages and other combinations of stages, if desired. Furthermore, although comparison logic 144 is shown in FIG. 5 for simplicity as being coupled to one pipeline 132 via decoders 155, 157, 159, and 161, it should be noted that it is preferable for each pipeline 132 to be similarly coupled to comparison logic 144 via similar decoders.

Figure 6:
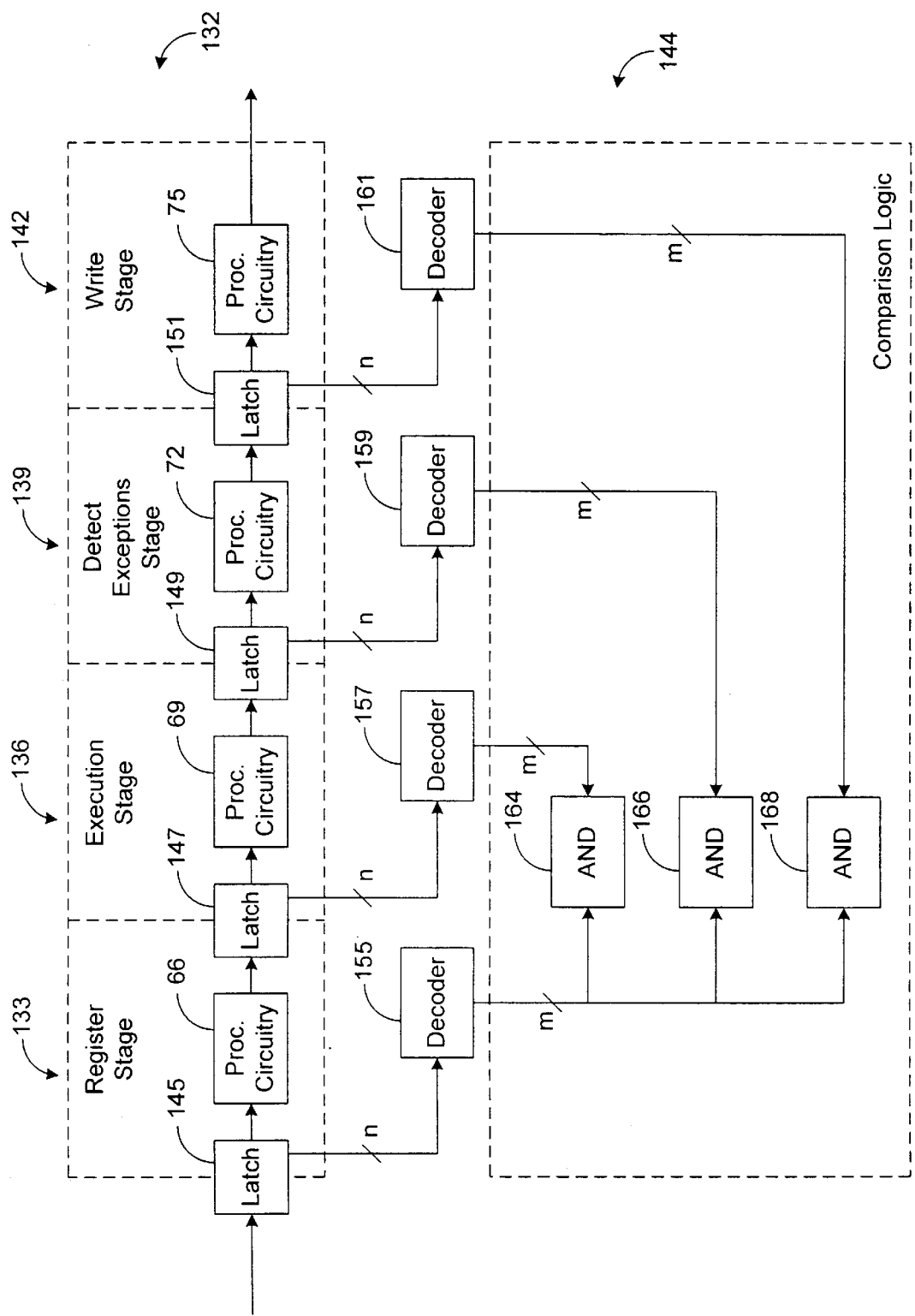
FIG. 6 is a block diagram illustrating a more detailed view of a pipeline and comparison logic depicted in FIG. 5.

As shown by FIG. 6, the processing system 100 includes latches 145, 147, 149, and 151 that are used to control the timing of the system 100. In this regard, through techniques known in the art, latches 145, 147, 149, and 151 respectively latch instructions into processing circuitry 66, 69, 72, and 75. Similar to conventional system 15, the latches 145, 147, 149, and 151 are preferably controlled such that each of the processing circuitry 66, 69, 72, and 75 in each of the stages 133, 136, 139, and 142 only processes one instruction at a time. Furthermore, the pipeline 132 depicted by FIG. 6 may simultaneously process up to four instructions, one instruction for each of the processing circuitry 66, 69, 72, and 75. However, it may be possible for any of the processing circuitry 66, 69, 72 and/or 75 to simultaneously process more than one instruction at a time in other embodiments.

The latches 145, 147, 149, and 151 are configured to respectively transmit to decoders 155, 157, 159, and 161 encoded n-bit register identifiers respectively defined by the instructions being latched by the latches 145, 147, 149, and 151. Therefore, when each of the latches 145, 147, 149, and 151 respectively transmits an instruction to processing circuitry 66, 69, 72, and 75, each of the latches 145, 147, 149, and 151 also respectively transmits an encoded n-bit register identifier defined by the respective instruction to decoders 155, 157, 159, and 161.

Each of the decoders 155, 157, 159, and 161 is designed to decode the received n-bit register identifier into an m-bit register identifier that identifies the same register 37 as the received n-bit register identifier. The value m preferably corresponds to the number of registers 37 associated with the system 100, and each bit in each m-bit register identifier corresponds to a particular register 37. Each decoder 155, 157, 159, and 161 is preferably configured to determine which register 37 is identified by the received n-bit register identifier and to assert the bit in the m-bit register identifier that corresponds to the identified register 37. The remaining bits in the m-bit register identifier are deasserted. As a result, each m-bit register identifier should have one bit asserted and the remainder of the bits deasserted. The asserted bit corresponds to a register 37 that is utilized by the instruction that included the received n-bit register identifier. It should be noted, however, that other techniques may be employed to decode the n-bit register identifiers and that other identifiers may be used to identify the registers 37 associated with the instructions.

Each decoder 155, 157, 159, and 161 transmits the decoded m-bit register identifier to comparison logic 144, which compares each received m-bit register identifier to at least one other received m-bit register identifier to determine whether or not a data dependency and/or a data dependency hazard exists. Note that a data dependency hazard between two instructions does not exist unless there is a data dependency between the two instructions. Therefore, the detection of a data dependency hazard should also be considered to be a detection of a data dependency.

To illustrate the functionality of comparison logic 144, assume that, similar to conventional system 15, it is desirable to determine whether a consumer in the register stage 133 has a data dependency hazard with any producer in any of the other stages 136, 139, or 142. In this example, assuming that a consumer is in the register stage 133 and that producers are in the other stages 136, 139, and 142, the m-bit register identifier decoded by decoder 155 should be compared to each of the m-bit register identifiers decoded by decoders 157, 159, and 161.

Therefore, as shown by FIG. 6, the m-bit register identifier decoded by decoder 155 is transmitted to AND logic 164, 166, and 168, and the m-bit register identifiers decoded by decoders 157, 159, and 161 are respectively transmitted to AND logic 164, 166, and 168. Each of the AND logic 164, 166, and 168 then compares the received m-bit register identifiers to determine whether or not a data dependency exists between the consumer being processed in the register stage 133 and any of the producers being processed in any of the other stages 136, 139, and 142. If there is a data dependency between the consumer in the register stage 133 and any one of the producers in the other stages 136, 139, and 142 that has yet to produce its data (i.e., has yet to make its data available to the consumer), then the comparison logic 144 determines that a data dependency hazard exists between the consumer and the one producer. Control circuitry (not shown) may then stall the consumer in the register stage 133 (or take other steps) in response to such a determination to prevent a data dependency error.

Figure 7:
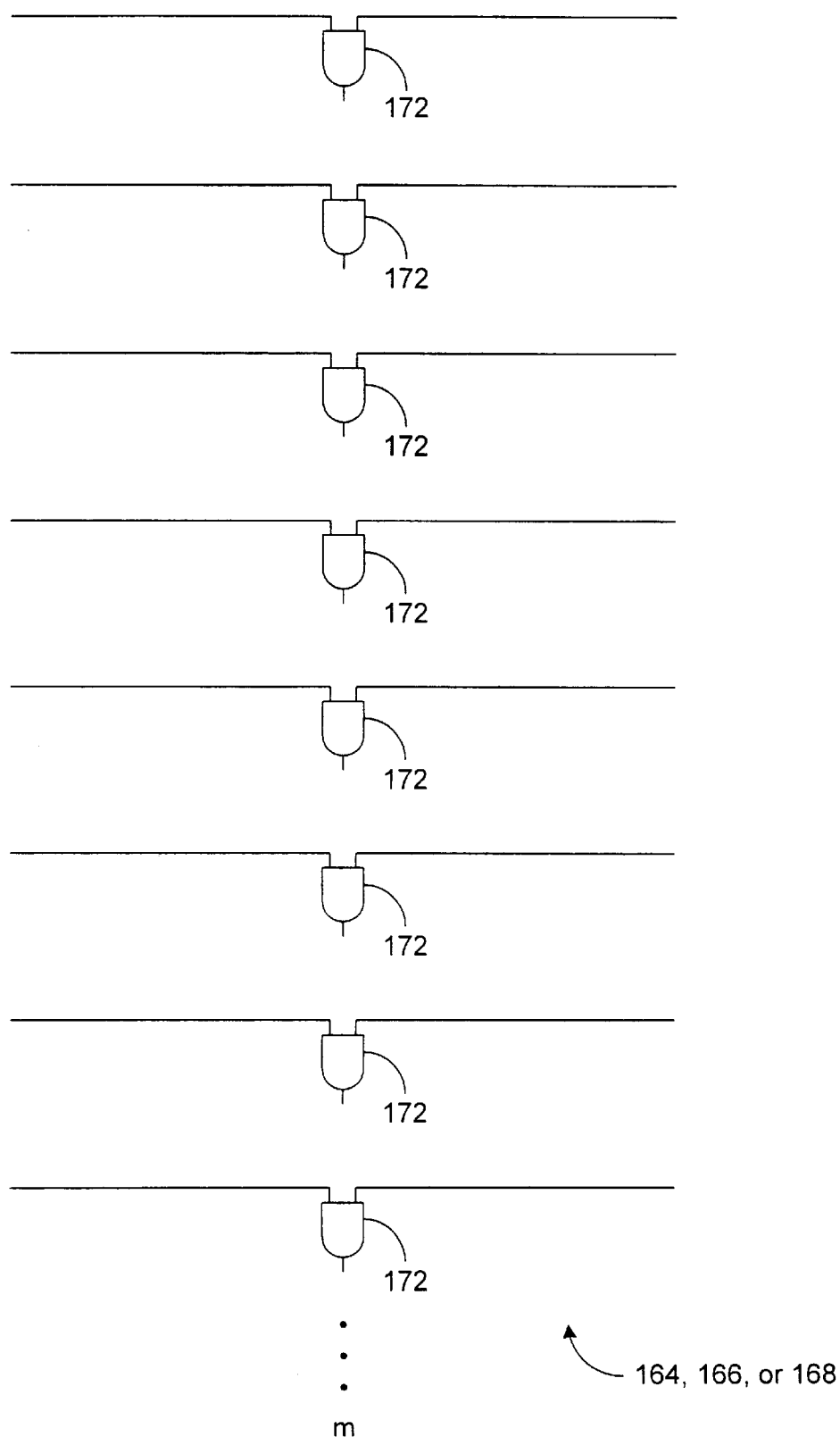
FIG. 7 is a block diagram illustrating a more detailed view of AND logic depicted in FIG. 6.
Figure 8:
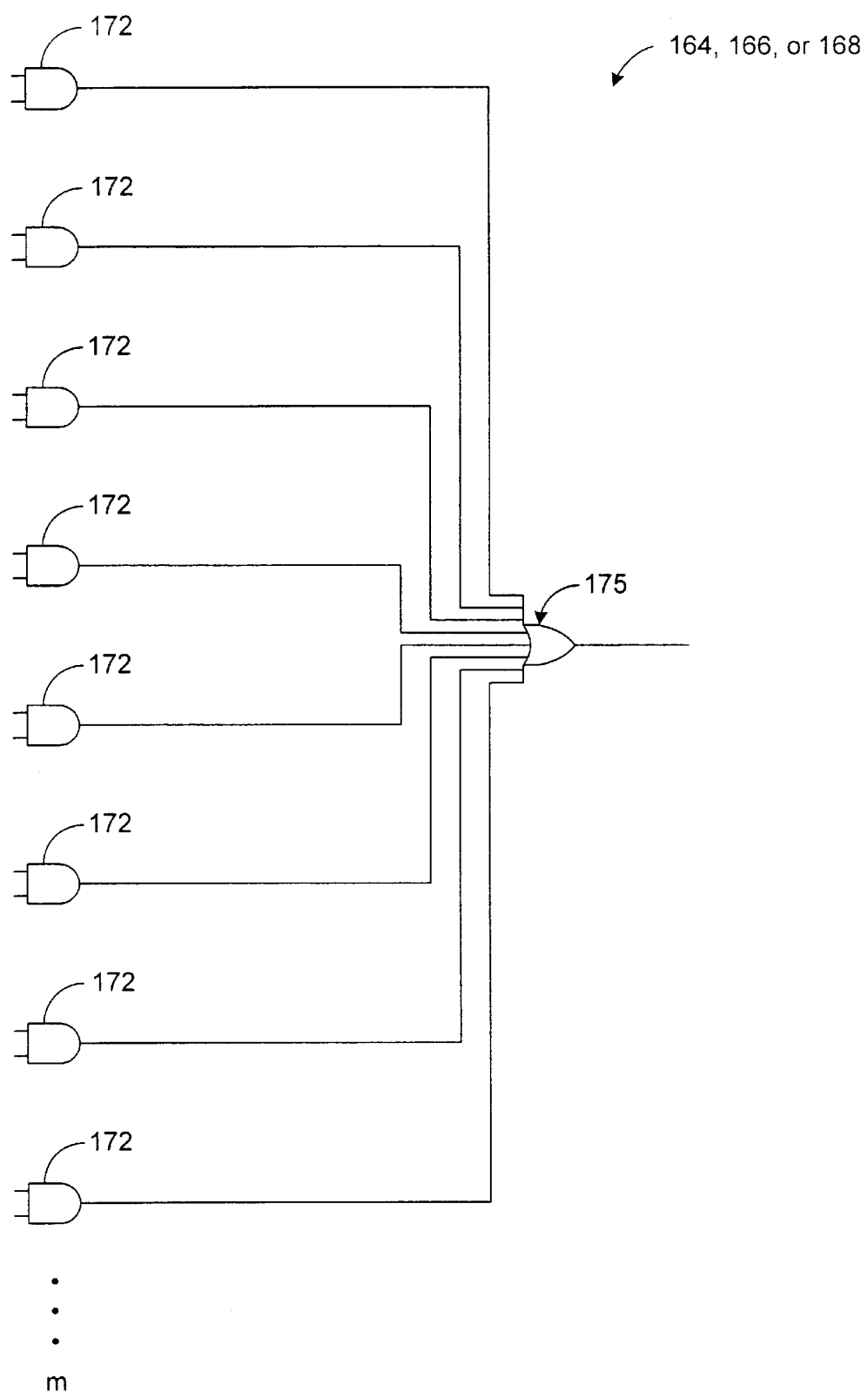
FIG. 8 is a block diagram illustrating another embodiment of the AND logic depicted in FIG. 7.

FIG. 7 shows logic suitable for implementing AND logic 164, 166, and 168. In this regard, each AND logic 164, 166, and 168 includes an m number of AND gates 172 that each receive a bit from one of the received m-bit register identifiers and a bit from the other received m-bit register identifier. Both bits received by each AND gate 172 preferably correspond to the same register 37. Therefore, if the two received m-bit register identifiers match, one of the AND gates 172 should produce an asserted output. Accordingly, the outputs of the AND gates 172 can be analyzed, and if any of the outputs of the AND gates 172 is asserted, then a determination can be made that a data dependency exists between the instructions that are associated with the matching m-bit register identifiers. To quickly analyze the outputs of AND gates 172, each of the outputs can be transmitted to an OR gate 175 (FIG. 8), which produces an asserted output only when the two compared m-bit register identifiers match.

As a result of the design of the system 100, the amount of circuitry, including wiring, and of space required to detect data dependencies and, therefore, data dependency hazards is reduced as compared to conventional system 15. In particular, the number of wires used in FIG. 2 to transmit register identifiers from stage-to-stage can be significantly reduced, and implementation of the comparison logic 144 can be much simpler and much smaller than the implementation of the n-bit comparators, as described for the comparison logic 24 of FIG. 3. In addition the devices used to implement the decoders 155, 157, 159, and 161 and the comparison logic 144 can be easily arranged to minimize space and wiring complexity. Furthermore, the decoders 155, 157, 159, and 161 may utilize less space than the latches 44, 46, 48, and 52 (FIG. 2). As a result, the circuitry of system 100 for detecting data dependencies and/or data dependency hazards can be much more compact and efficient than the circuitry of conventional system 15.

It should be noted that FIG. 6 depicts circuitry capable of comparing one register identifier from each instruction in the pipeline 132 with other register identifiers. However, it may be possible for instructions to include more than one register identifier. Therefore, additional circuitry, similar to the circuitry of FIG. 6, may be implemented to ensure that each register identifier of each instruction can be tested. For example, the consumer in the register stage 133 may retrieve data from two different registers 37 when executed and, therefore, include two different register identifiers. To accommodate such an instruction, the register stage 133 preferably includes another decoder 155 that decodes the other register identifier into an m-bit register identifier that can be compared to the other m-bit register identifiers in the other stages 136, 139, and 142 by comparison logic 144. Therefore, it should be apparent to one skilled in the art that the design shown by FIG. 6 can be expanded as necessary to accommodate instructions that are associated with more than one register identifier.

Furthermore, FIG. 6 depicts circuitry for a single pipeline 132. In superscalar systems 100, it is desirable to check for data dependency hazards and, therefore, data dependencies between instructions in different pipelines 132. Therefore, it should be apparent to one skilled in the art that the m-bit register identifiers of instructions in one pipeline 132 can be compared to m-bit register identifiers of instructions in the same or other pipelines 132 according to the techniques described herein to check for data dependencies and/or data dependency hazards between instructions of different pipelines 132. For example, the m-bit register identifier decoded by decoder 155 of one pipeline 132 can be compared to the m-bit register identifiers decoded by decoders 157, 159, and 161 of another pipeline 132 via logic similar to AND logic 164, 166, and 168 to determine whether there is a data dependency and/or data dependency hazard between the instruction in the register stage 133 of the one pipeline 132 and the instructions in the stages 136, 139, and 142 of the other pipeline 132.

Furthermore, it is generally desirable, to compare the register identifier associated with each consumer in the register stage 133 with the register identifiers of each producer in stages 136, 139, and 142, as described herein. However, in other embodiments, the register identifier from any one stage 133, 136, 139, or 142 of any one pipeline 132 can be compared to the register identifier from any one stage 133, 136, 139, or 142 of any one pipeline 132 to determine whether a data dependency exists between the two instructions associated with the compared register identifiers.

Coalescing of Data

If desired, the data provided to the comparison logic 144 may be coalesced to enable efficient detection of data hazards. For example, as shown by FIG. 9, coalescing circuitry 177 and 179 may be configured to coalesce the data received from decoders 155, 157, 159, and 161 and to interface this data with the comparison logic 144, as shown by FIG. 9.

Figure 9:
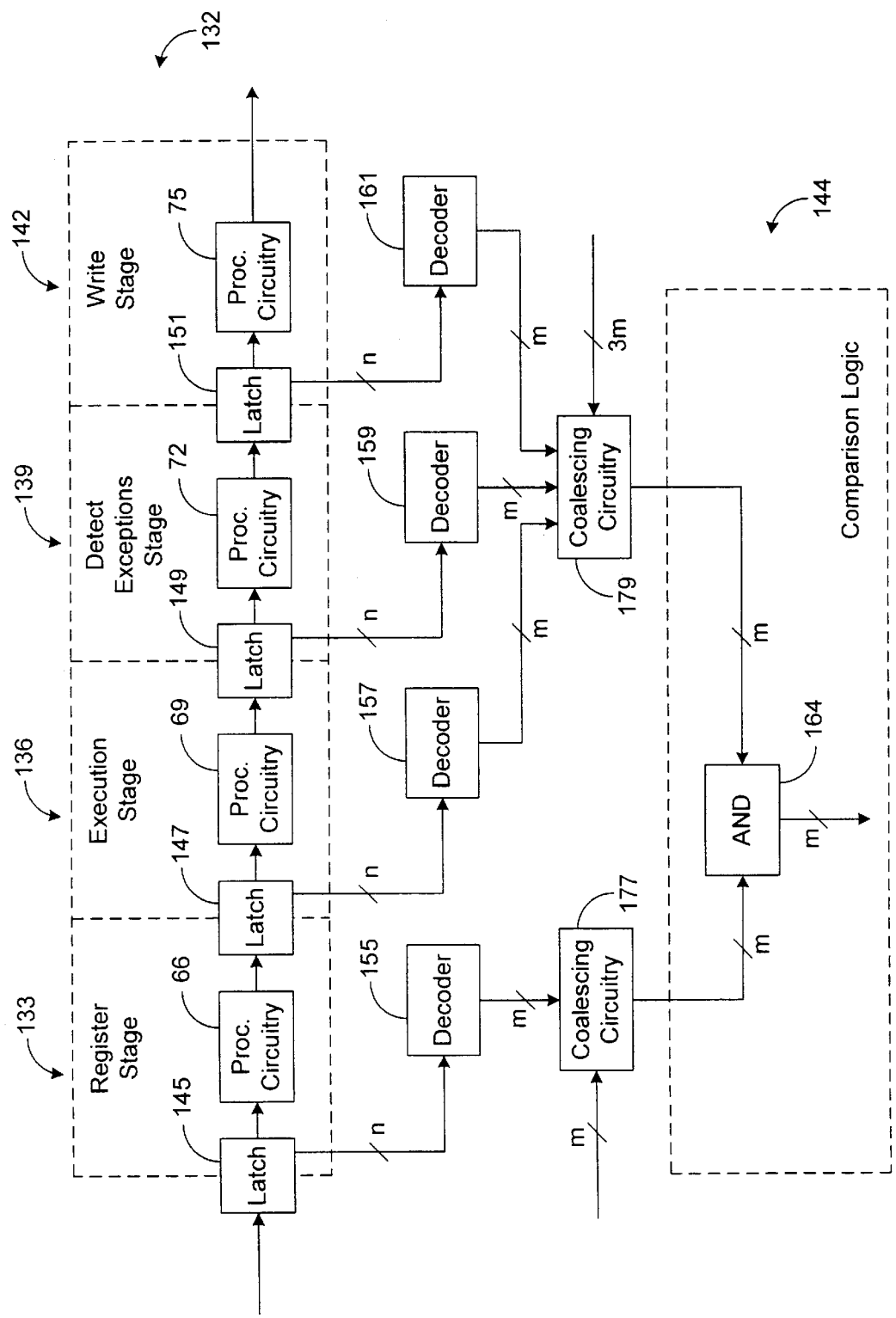
FIG. 9 is a block diagram illustrating coalescing circuitry that may be used to coalesce the data communicated between the pipeline and the comparison logic of FIG. 6.

The coalescing circuitry 177 is configured to receive an m-bit register identifier from the register stage 133 of the pipeline 132 shown by FIG. 9 and at least one m-bit register identifier from another stage and/or from another pipeline 132 and to combine at least a portion of the data defining the received m-bit register identifiers. For example, in the embodiment shown by FIG. 9, the coalescing circuitry 177 receives an m-bit register identifier from the decoder 155 associated with the register stage 133 of the pipeline 132 shown by FIG. 9 and an m-bit register identifier from another pipeline 132. The coalescing circuitry 177 then combines the received register identifiers into a single m-bit register identifier that identifies each of the registers 37 (FIG. 5) identified by the received register identifiers.

In this regard, each bit in the m-bit register identifier produced by the coalescing circuitry 177 corresponds to a different one of the registers 37 of the system 100. Furthermore, the coalescing circuitry 177 is designed to assert each bit in the foregoing m-bit register identifier that corresponds to a register 37 identified by one of the received m-bit register identifiers and to deassert the remaining bits of the m-bit register identifier.

However, it should be noted that the coalescing circuitry 177 preferably receives each m-bit register identifier associated with each consumer in the register stage 133 of any of the pipelines 132. Therefore, the circuitry shown by FIG. 9 may be in accordance with the preferred embodiment, if it is assumed that only two pipelines 132 are in the system 100 and that each consumer only reads from a single register 37, when executed. However, in many applications, the number of pipelines 132 exceeds two, and there may be more than one register 37 read via the execution of a single consumer. As a result, the number of register identifiers received by the coalescing circuitry 177 may be increased.

In any event, the m-bit register identifier produced by the coalescing circuitry 177 identifies each register 37 that is identified by an m-bit register identifier received by the coalescing circuitry 177 and, in doing so, preferably identifies each register 37 that is to be read via the execution of any of the consumers in the register stage 133 of any of the pipelines 132. In this regard, each bit of the m-bit register identifier produced by the coalescing circuitry 177 that corresponds to one of the registers 37 identified by a received m-bit register identifier should be asserted. The remainder of the bits in the m-bit register identifier produced by the coalescing circuitry 177 should be deasserted.

The coalescing circuitry 179 is configured to receive an m-bit register identifier from the stages 136, 139, and/or 142 of the pipeline 132 shown by FIG. 9 and/or to receive an m-bit register identifier from another pipeline(s) 132. The coalescing circuitry 179, similar to coalescing circuitry 177, is then designed to combine at least a portion of the data defining the received m-bit register identifiers. For example, in the embodiment shown by FIG. 9, the coalescing circuitry 179 receives an m-bit register identifier from each of the stages 136, 139, and 142 of the pipeline 132 shown by FIG. 9 and an m-bit register identifier from each of the stages 136, 139, and 142 from another pipeline 132. The coalescing circuitry 179 then combines the received register identifiers into a single m-bit register identifier that identifies each of the registers 37 (FIG. 5) identified by the received register identifiers.

In this regard, each bit in the m-bit register identifier produced by the coalescing circuitry 179 corresponds to a different one of the registers 37 of the system 100. Furthermore, the coalescing circuitry 179 is designed to assert each bit in the foregoing m-bit register identifier that corresponds to a register 37 identified by one of the received m-bit register identifiers and to deassert the remaining bits of the m-bit register identifier.

However, it should be noted that the coalescing circuitry 179 preferably receives each m-bit register identifier associated with any of the producers in any of the stages 133, 139, and 142 of any of the pipelines 132. Therefore, as previously set forth, the circuitry shown by FIG. 9 may be in accordance with the preferred embodiment, if it assumed that only two pipelines 132 are in the system 100 and that each producer only writes to a single register 37. However, in many applications, the number of pipelines 132 exceeds two, and there may be more than one register 37 written to via the execution of a single producer. As a result, the number of register identifiers received by the coalescing circuitry 179 may be increased. In addition, it is not necessary for the coalescing circuitry 179 to receive a register identifier from each of the stages 136, 139, and 142.

In any event, the m-bit register identifier produced by the coalescing circuitry 179 identifies each register 37 that is identified by an m-bit register identifier received by the coalescing circuitry 179 and, in doing so, preferably identifies each register 37 that is written to by any of the producers in the stages 136, 139, or 142 of any of the pipelines 132. In this regard, each bit of the m-bit register identifier produced by the coalescing circuitry 179 that corresponds to one of the registers 37 identified by a received m-bit register identifier should be asserted. The remainder of the bits in the m-bit register identifier produced by the coalescing circuitry 179 should be deasserted.

Figure 10:
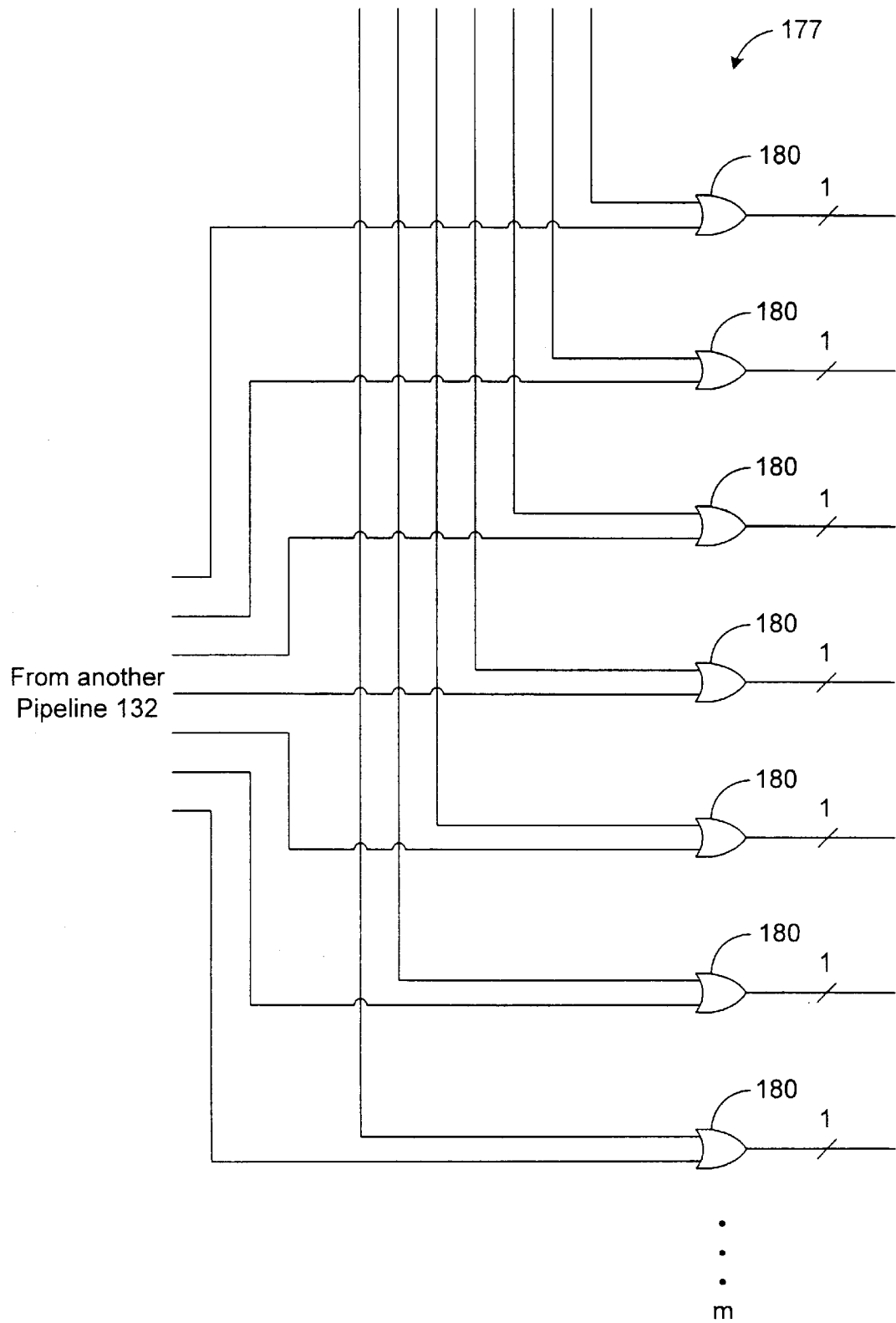
FIG. 10 is a block diagram illustrating a more detailed view of a portion of the coalescing circuitry depicted by FIG. 9.

FIG. 10 depicts exemplary circuitry that may be used to implement the coalescing circuitry 177. In this regard, the coalescing circuitry 177 may include m number of OR gates 180. Each of the OR gates 180 receives one bit from each of the register identifiers received by the coalescing circuitry 177. Furthermore, each bit received by a single OR gate 180 preferably corresponds to the same register 37 (FIG. 5). Therefore, for each register 37 identified by one of the m-bit register identifiers received by coalescing circuitry 177, one of the OR gates 180 should produce an asserted output. As a result, the coalescing circuitry 177 produces an m-bit register identifier, in which each bit of the m-bit register identifier corresponds to one of the registers 37. The bits in the m-bit register identifier corresponding to the registers 37 identified by any of the received register identifiers should be asserted, while the remaining bits should be deasserted.

Figure 11:
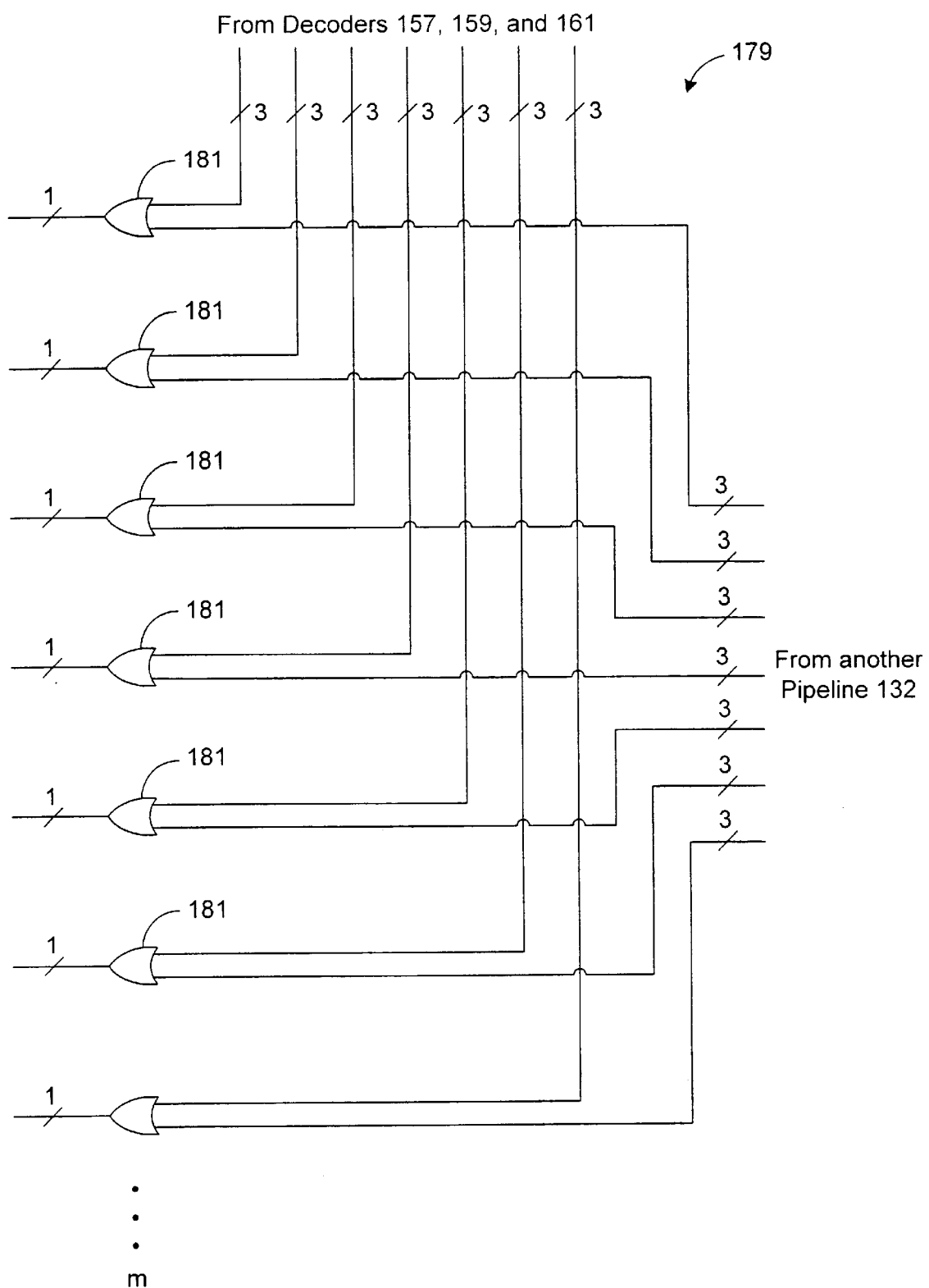
FIG. 11 is a block diagram illustrating a more detailed view of another portion of the coalescing circuitry depicted by FIG. 9.

FIG. 11 depicts exemplary circuitry that may be used to implement the coalescing circuitry 179. In this regard, the coalescing circuitry 179 may include m number of OR gates 181. Each of the OR gates 181 receives one bit from each of the register identifiers received by the coalescing circuitry 179. Furthermore, each bit received by a single OR gate 181 preferably corresponds to the same register 37. Therefore, for each register 37 identified by one of the m-bit register identifiers received by coalescing circuitry 179, one of the OR gates 181 should produce an asserted output. As a result, the coalescing circuitry 179 produces an m-bit register identifier, in which each bit of the m-bit register identifier corresponds to one of the registers 37. The bits in the m-bit register identifier corresponding to the registers 37 identified by any of the received register identifiers should be asserted, while the remaining bits should be deasserted.

By comparing the m-bit register identifiers presently produced by the coalescing circuitry 177 and 179, the comparison logic 144 may determine whether any data hazards exist between any of the instructions being processed by the pipelines 132. To compare the register identifiers produced by coalescing circuitry 177 and 179, the AND logic 164 shown by FIG. 7 may be implemented.

In this regard, each of the AND gates 172 (FIG. 7) receives one bit from each of the register identifiers produced by the coalescing circuitry 177 and 179. Furthermore, each bit received by a single AND gate 172 preferably corresponds to the same register 37. Therefore, for each register 37 identified by both of the m-bit register identifiers received from coalescing circuitry 177 and 179, one of the AND gates 172 should produce an asserted output. As a result, the AND logic 164 in FIG. 9 produces an m-bit register identifier, in which each bit of the m-bit register identifier corresponds to one of the registers 37. The bits in the m-bit register identifier corresponding to the registers 37 identified by both of the register identifiers received from coalescing circuitry 177 and 179 should be asserted, while the remaining bits should be deasserted.

Therefore, each of the asserted bits of the m-bit register identifier produced by the AND logic 164 indicates that a data hazard associated with the corresponding register 37 may exist, and each of the deasserted bits of the m-bit register identifier produced by the AND logic 164 indicates that a data hazard associated with the corresponding register 37 should not exist. Consequently, the comparison logic 144 may be configured to detect a data hazard for each asserted bit in the m-bit register identifier produced by AND logic 164.

Attribute Data

To further increase the efficiency of the system 100, additional circuitry can be implemented to prevent unnecessary stalls so that the delays incurred in processing the instructions of the pipelines 132 are decreased. In this regard, predication techniques have been developed that enable and disable the instructions being processed by the pipelines. The enabled instructions are executed by the pipelines 132, and the disabled instructions pass through the pipelines 132 without execution. Commonly assigned U.S. Patent Application entitled "System and Method for Providing Predicate Data," which is incorporated herein by reference, further describes a process of using predicate data to increase processor performance.

To minimize the adverse effects of stalls, the predicate data can be analyzed to determine whether an instruction is to be executed by the pipelines 132. If it can be determined from the predicate data that an instruction is not to be executed, then it is not possible for the instruction to cause a data error due to a data hazard between the instruction and another instruction. Therefore, even if a register identifier of the instruction matches a register identifier of another instruction, a data hazard does not actually exist between the instructions, if one of the instructions is disabled by predicate data. As a result, to prevent unnecessary stalls, it is desirable for the comparison logic 144 to refrain from detecting data hazards between two instructions when one of the instructions is disabled by predicate data.

Furthermore, as will be described in further detail hereinbelow, it is sometimes possible to determine, based on the types of instructions being processed by the pipelines 132, that a data hazard does not exist between two instructions, even when the register identifiers of the two instructions match. As a result, it may be desirable to include additional circuitry in the system 100 that is capable of analyzing attribute data, such as data indicating the predicate status and/or the types of instructions being processed by the pipelines 132, so that needless occurrences of stalls can be prevented.

Figure 12:
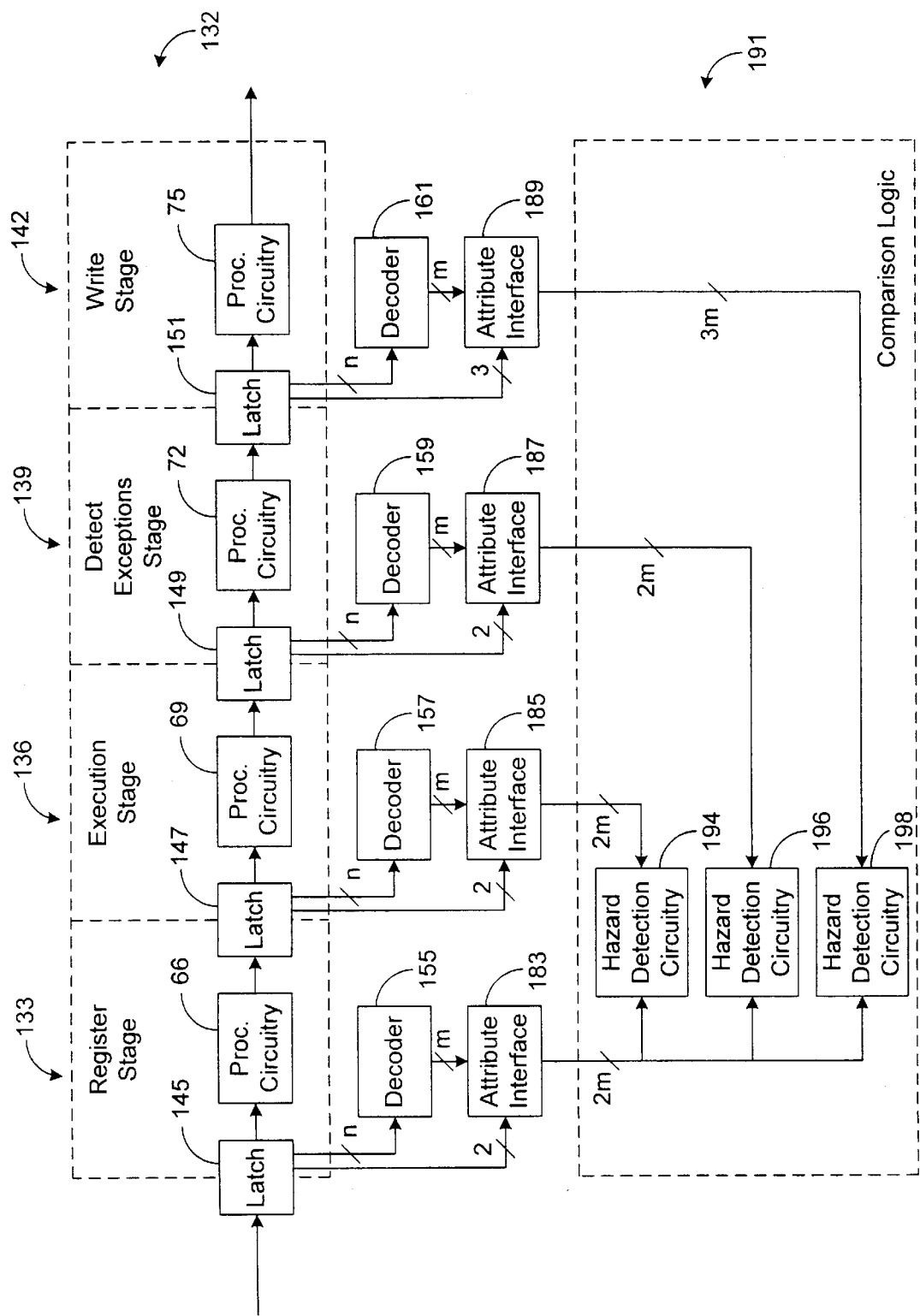
FIG. 12 is a block diagram illustrating another embodiment of a pipeline and comparison logic in accordance with the present invention that utilizes attribute data to detect data hazards.

FIG. 12 depicts additional circuitry 183, 185, 187, and 189 that may be utilized by the system 100 to analyze attribute data (i.e., data indicating the type and/or the predicate status of an instruction) in detecting data hazards. As shown by FIG. 12, the m-bit register identifiers produced by decoders 155, 157, 159, and 161 are respectively input into attribute interfaces 183, 185, 187, and 189, and the attribute interfaces 183, 185, 187, and 189 respectively receive attribute data from the latches 145, 147, 149, and 151. Each of the attribute interfaces 183, 185, 187, and 189 then interfaces the received attribute data with the received m-bit register identifier to produce data indicative of not only which register 37 (FIG. 5) is used to execute the instruction associated with the received m-bit register identifier but is also indicative of the type of the instruction and/or the instruction's predicate status. Therefore, the comparison circuitry 191 may detect whether a data hazard exists between the foregoing instruction and another instruction based on not only the registers 37 utilized to execute the instructions but also based on the types of the instructions and/or the predicate status of the instructions. As a result, comparison logic 191 is configured to detect data hazards more precisely than the comparison logic 144.

As an example, assume for illustrative purposes that a non-multimedia (non-mmu) consumer in the register stage 133 defines a data hazard with a producer in the detect exceptions stage 139 only when the producer is a multimedia (mmu) instruction. Assume further that a non-mmu consumer is presently in the register stage 133. If comparison logic 144 (FIG. 6) does not analyze attribute data and, therefore, does not take into account the types of instructions being processed by pipelines 132 and the predicate status of the instructions, then comparison logic 144 should detect a data hazard whenever the register identifier received by the decoder 159 of one of the pipelines 132 matches the register identifier simultaneously received by decoder 155 of one of the pipelines 132.

Therefore, the aforementioned consumer in the register stage 133 should be stalled until at least all of the producers in the detect exceptions stage 139 of the pipelines 132 having the same register identifier as the consumer in the register stage 133 advance to at least the write stage 142. In other words, since at least one type of producer produces data that is unavailable to at least one type of consumer in the register stage 133 until the producer at least reaches the write stage 142, the consumer should be stalled in the register stage 133 until all producers that are earlier than the consumer and that have the same register identifier as the consumer at least reach the write stage 142. Otherwise, a data error may occur when a producer in the detect exceptions stage 139 of one of the pipelines 132 is a mmu instruction and the consumer in the register stage 133 is a non-mmu instruction.

However, the comparison circuitry 191 is designed to receive and analyze not only the register identifiers of the instructions but also the attribute data indicating the types and/or predicate status of the instructions. Therefore, the comparison logic 191 may detect that there is no data hazard between a producer in the detect exceptions stage 139 and a consumer in the register stage 133, even when the two instructions have the same register identifier.

In this regard, the latch 145 of the register stage 133 transmits a bit of attribute data indicating the predicate status of the instruction in the register stage 133 and transmits a bit of attribute data indicating whether or not the instruction in the register stage 133 is a particular type of instruction (e.g., a mmu instruction in the aforementioned embodiment). Furthermore, the latch 149 of the detect exceptions stage 139 transmits a bit of attribute data indicating the predicate status of the instruction in the detect exceptions stage 139 and transmits a bit of attribute data indicating whether or not the instruction in the detect exceptions stage 139 is a particular type of instruction (e.g., a mmu instruction in the aforementioned embodiment). The attribute interfaces 183 and 187 respectively receive the attribute data from latches 145 and 149 and transmit data indicative of the received attribute data and the decoded register identifier from decoders 155 and 159 to hazard detection circuitry 196.

The hazard detection circuitry 196 is designed to detect a data hazard only if: 1) the consumer in the register stage 133 has the same register identifier as the producer in the detect exceptions stage 139, 2) both of the instructions in the register stage 133 and the detect exceptions stage 139 are predicate enabled, and 3) the types of the instructions in the register stage 133 and detect exceptions stage 139 are such that a data hazard may exist between the two instructions. For illustrative purposes, assume that condition 3 is satisfied only if: (a) the consumer in the register stage 133 is a non-mmu instruction and the producer in the detect exceptions stage 139 is a mmu instruction or (b) the consumer in the register stage 133 is a mmu instruction and the producer in the detect exceptions stage 139 is a non-mmu instruction. However, it should be apparent to one skilled in the art that other types and/or other combinations of instruction types may satisfy condition 3, requiring modification of the circuitry used to implement the aforementioned embodiment of the present invention, which is described in more detail hereinafter.

If any of the three foregoing conditions (i.e., conditions 1–3) are not satisfied, then the hazard detection circuitry 196 fails to detect a data hazard. As a result, in some situations, the stall on a consumer in the register stage 133 can either be prevented or can be removed before a producer having the same register identifier as the consumer reaches the write stage 142, thereby enabling the consumer to be processed by the pipelines 132 earlier.

Figure 13:
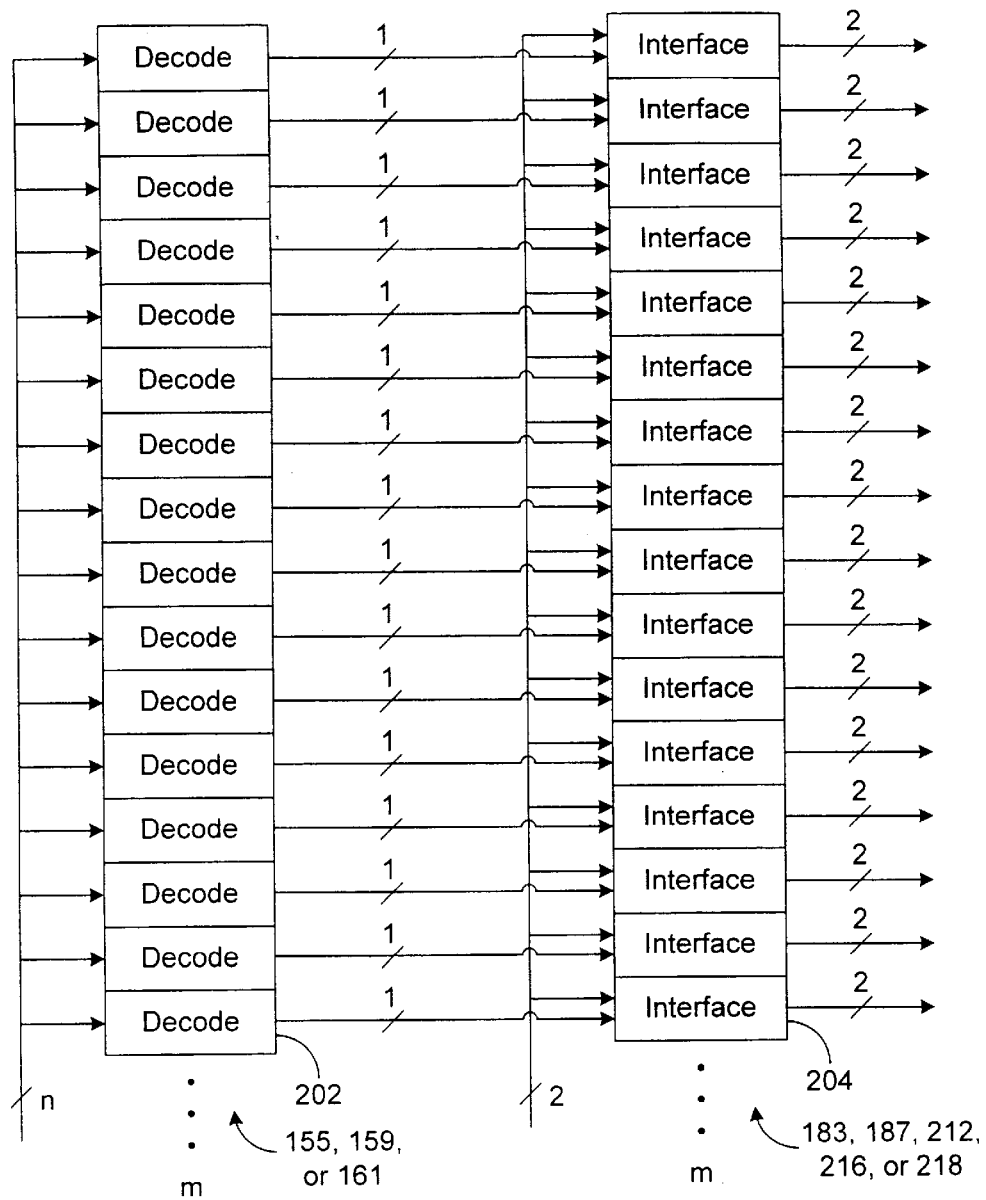
FIG. 13 is block diagram illustrating a more detailed view of a decoder and of an attribute interface depicted in FIG. 12.

FIG. 13 depicts an exemplary implementation of the decoder 155 coupled to the attribute interface 183. In this regard, the decoder 155 is a column of logic having m rows of decode logic 202 respectively corresponding with the registers 37 (FIG. 5) of the processing system 100. Each row of decode logic 202 is designed to receive the n-bit register identifier transmitted to the decoder 155 and to transmit an asserted output if the n-bit register identifier identifies the register 37 corresponding to the row of decode logic 202 and to transmit a deasserted output if the n-bit register identifier identifies another register 37. In other words, each row of decode logic 202 outputs a bit of the m-bit register identifier produced by the decoder 155.

The attribute interface 183 includes m rows of interface logic 204 respectively corresponding with the rows of decode logic 202 and, therefore, the registers 37 of the system 100. Each row of interface logic 204 is configured to receive an output of one of the rows of decode logic 202 and to receive the attribute data transmitted from latch 145. Note that the attribute data processed by other attribute interfaces 185, 187, and 189 is respectively received from latches 147, 149, and 151.

Figure 14:
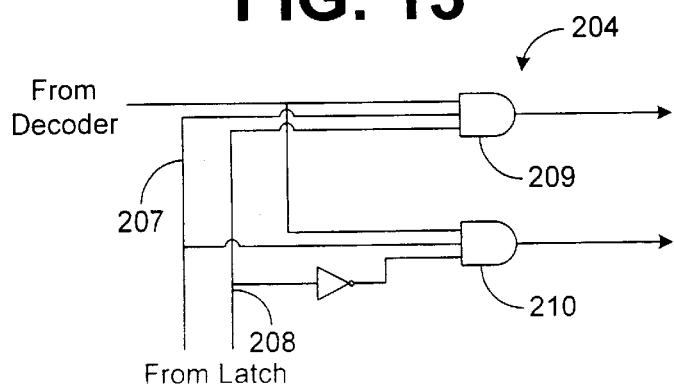
FIG. 14 is a block diagram illustrating a more detailed view of a row of interface logic depicted in FIG. 13.

The latch 145 may be configured to transmit to attribute interface 183 a bit value indicating the predicate status of the instruction in the register stage 133 (i.e., indicating whether the instruction in the register stage is enabled) and at least one bit value indicating whether the instruction in the register stage 133 is a particular type or types of instruction. As an example, the latch 145 preferably asserts one of the bits (i.e., the bit transmitted across connection 207 in FIG. 14) only if the instruction in the register stage 133 is predicate enabled and asserts the other bit (i.e., the bit transmitted across connection 208) only if the instruction in the register stage 133 is a mmu instruction.

Each row of interface logic 204 in the attribute interface 183 is configured to produce an output indicating not only whether the bit received from the decoder 155 is asserted but also indicating the predicate status and/or the type of instruction in the register stage 133. For example, each row of interface logic 204 in the embodiment depicted by FIGS. 13 and 14 may produce a two bit output. Either of the bits output by a single row of interface logic 204 may be asserted only if the row of interface logic 204 corresponds to the register 37 identified by the n-bit register identifier presently received by decoder 155 and if the instruction in the register stage 133 is predicate enabled. In other words, each row of interface logic 204 is configured to deassert both output bits, if the bit value received from decoder 155 is deasserted or if the bit value transmitted across connection 207 is deasserted.

Each row of interface logic 204 in the attribute interface 183 is further configured to respectively assert each output bit only if the attribute data received from latch 145 indicates that the instruction in the register stage 133 is a particular type of instruction. For example, the AND gate 209 of FIG. 14 for the attribute interface 183 may produce an asserted output only if the instruction in the register stage 133 is a mmu instruction, and the AND gate 210 of FIG. 14 for the attribute interface 183 may produce an asserted output only if the instruction in the register stage 133 is a non-mmu instruction.

In this regard, if the output of AND gate 209 is asserted, then it is known that the instruction in the register stage 133: 1) is enabled, 2) is a mmu instruction (i.e., is of a type that may define a data hazard with an instruction in the detect exceptions stage 139 only when the instruction in the detect exceptions stage 139 is a non-mmu instruction), and 3) utilizes the register 37 corresponding with the row of interface logic 204 containing the AND gate 209. Furthermore, if the output of AND gate 210 is asserted, then it is known that the instruction in the register stage 133: 1) is enabled, 2) is a non-mmu instruction (i.e., is of a type that may define a data hazard with an instruction in the detect exceptions stage 139 only when the instruction in the detect exceptions stage 139 is a mmu instruction), and 3) utilizes the register 37 corresponding with the row of interface logic 204 containing the foregoing AND gate 210.

The circuitry of decoder 159 and attribute interface 187 may be similar to or identical to that of decoder 155 and attribute interface 183 just described. Furthermore, similar to latch 145, the latch 149 asserts one of the attribute bits (i.e., the bit transmitted across connection 207 in FIG. 14) transmitted to attribute interface 187 only if the instruction in the detect exceptions stage 139 is enabled, and the latch 149 asserts the other attribute bit (i.e., the bit transmitted across connection 208 in FIG. 14) transmitted to attribute interface 187 only if the instruction in the detect exceptions stage 139 is of a particular type of instruction (e.g., a mmu instruction).

Similar to the output of attribute interface 183, the output of each row of interface logic 204 (FIG. 13) for the attribute interface 187 may be a two bit output. In this regard, the output of the AND gate 209 of FIG. 14 for the attribute interface 187 is preferably asserted only if the instruction in the detect exceptions stage 139: 1) is enabled, 2) is a mmu instruction (i.e., is of a type that may define a data hazard with an instruction in the register stage 133 only when the instruction in the register stage 133 is a non-mmu instruction), and 3) utilizes the register 37 corresponding with the row of interface logic containing the AND gate 209. Furthermore, the output of the AND gate 210 of FIG. 14 for the attribute interface 187 is asserted in the aforementioned embodiment only if the instruction in the detect exceptions stage 139: 1) is enabled, 2) is a non-mmu instruction (i.e., is of a type that may define a data hazard with an instruction in the register stage 133 only when the instruction in the register stage 133 is a mmu instruction), and 3) utilizes the register 37 corresponding with the row of interface logic 204 containing the foregoing AND gate 209

The hazard detection logic 196 receives and compares the outputs from attribute interfaces 183 and 187 and is configured to detect whether a data hazard exists based on the information input into the logic 196. In this regard, the hazard detection logic 196 detects a data hazard only if the register identifiers of the consumer in the register stage 133 and the producer in the detect exceptions stage 139 match, both the consumer and the producer are enabled, and the consumer and the producer are of a type that define a data hazard (e.g., (a) the consumer in the register stage 133 is a non-mmu instruction and the producer in the detect exceptions stage 139 is a mmu instruction or (b) the consumer in the register stage 133 is a mmu instruction and the producer in the detect exceptions stage is a non-mmu instruction).

Figure 15:
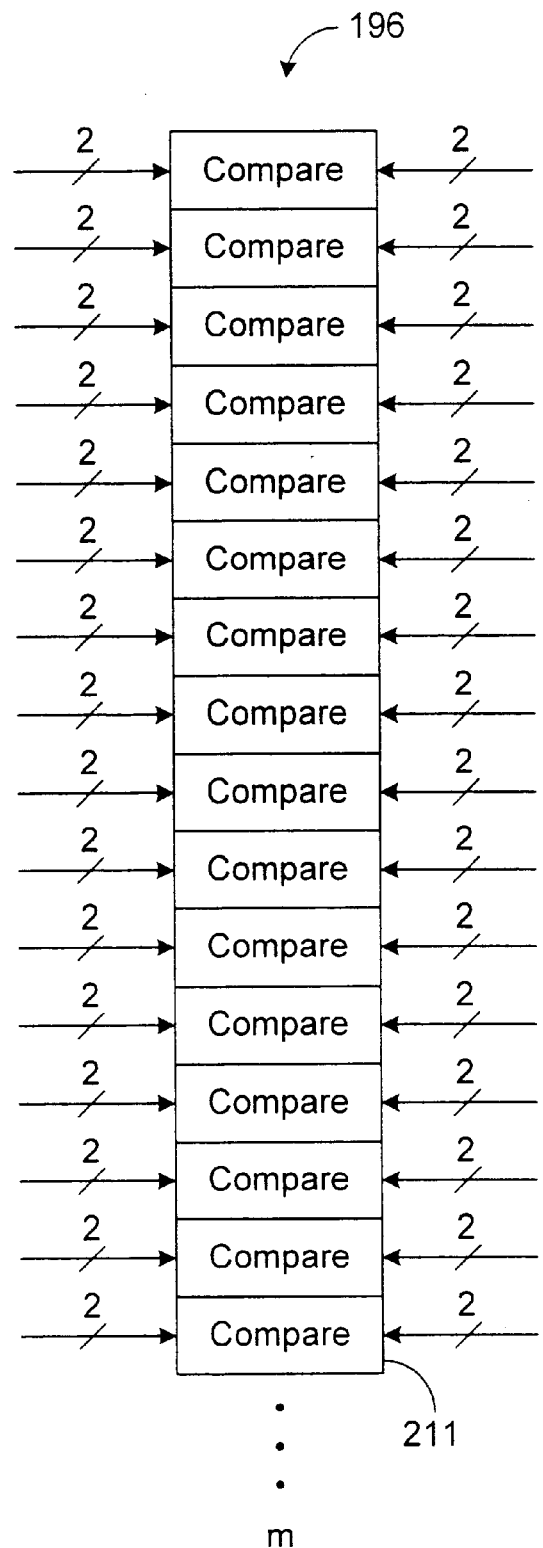
FIG. 15 is a block diagram illustrating a more detailed view of hazard detection circuitry depicted in FIG. 12.

FIG. 15 depicts circuitry that may be used to implement the hazard detection logic 196 in the aforementioned embodiment. In this regard, the hazard detection logic 196 includes m rows of compare logic 211. Each row of compare logic 211 is configured to receive the outputs from a single row of interface logic 204 from attribute interface 183 and a single row of interface logic 204 from attribute interface 187. The rows of interface logic 204 from attribute interfaces 183 and 187 transmitting outputs to the same row of compare logic 211 in hazard detection circuitry 196 preferably correspond to the same register 37. In other words, both rows of interface logic 204 from attribute interfaces 183 and 187 that are coupled to the same row of compare logic 211 in the hazard detection circuitry 196 may produce asserted outputs only when the n-bit register identifiers simultaneously received by decoders 155 and 159 match. Therefore, if none of the rows of compare logic 211 simultaneously receive at least one bit of asserted output from attribute interface 183 and one bit of asserted output from attribute interface 187, then the n-bit register identifiers associated with the instructions in the register stage 133 and the detect exceptions stage 139 do not match, or at least one of the instructions in the register stage 133 or the detect exceptions stage 139 is disabled. As a result, unless one row of compare logic 211 receives at least one asserted bit from attribute interface 183 and one asserted bit from attribute interface 187, the hazard detection logic 196 fails to detect a data hazard and transmits a signal indicating that no data hazard is presently detected.

However, if one of the rows of compare logic 211 simultaneously receives at least one bit of asserted output from attribute interface 183 and at least one bit of asserted output from attribute interface 187, then the n-bit register identifiers associated with the instructions in the register stage 133 and the detect exceptions stage 139 match. Therefore, the instructions in both the register stage 133 and the detect exceptions stage 139 are enabled, and further analysis is performed to determine whether or not a data hazard exists between these two instructions. In this regard, the row of compare logic 211 receiving the asserted outputs detects a data, hazard, unless the foregoing outputs from the attribute interfaces 183 and 187 indicate that the instructions in the register stage 133 and the detect exceptions stage 139 are of types that do not create a data hazard.

For example, in the exemplary embodiment described hereinbefore, the hazard detection circuitry 196 may detect a data hazard only if: (a) the output from attribute interface 187 indicates that the producer in the detect exceptions stage 139 is a mmu instruction and the output from attribute interface 183 indicates that the consumer in the register stage 133 is a non-mmu instruction or (b) the output from attribute interface 187 indicates that the producer in the detect exceptions stage 139 is a non-mmu instruction and the output from attribute interface 183 indicates that the consumer in the register stage 133 is a mmu instruction.

Figure 16:
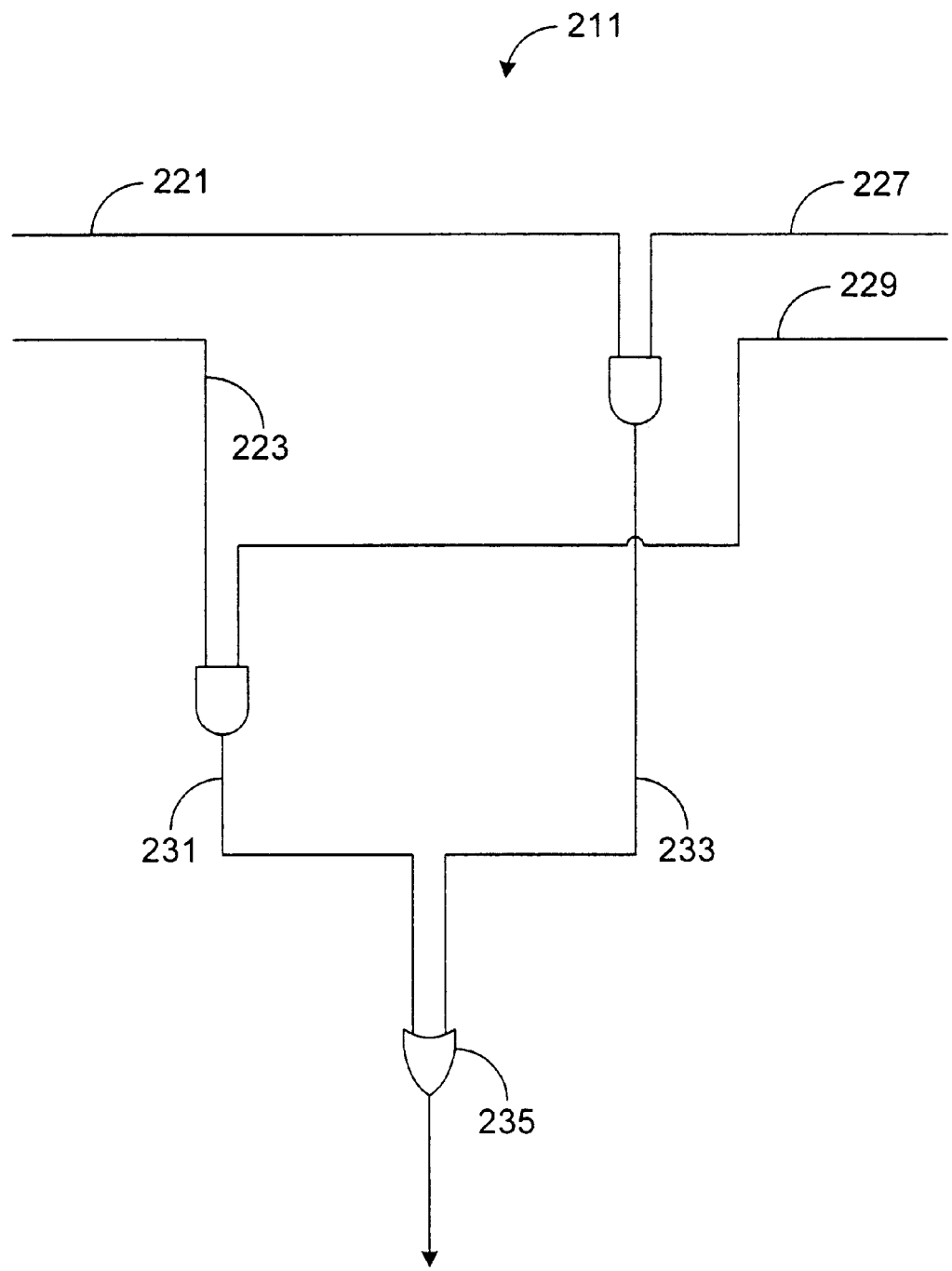
FIG. 16 is a block diagram illustrating a more detailed view of a row of compare logic depicted in FIG. 15.

FIG. 16 depicts circuitry that may be used to implement a row of compare logic 211 for the aforementioned embodiment. Connection 221 of FIG. 16 is coupled to the output of an AND gate 209 (FIG. 14) included in a row of interface logic 204 in attribute interface 183 (FIG. 12), and connection 223 is coupled to the output of an AND gate 210 (FIG. 14) included in the foregoing row of interface logic 204 in attribute interface 183 (FIG. 12). Furthermore, connection 227 of FIG. 16 is coupled to the output of an AND gate 210 (FIG. 14) included in a row of interface logic 204 in attribute interface 187 (FIG. 12), and connection 229 is coupled to the output of an AND gate 209 (FIG. 14) included in the foregoing row of interface logic 204 in attribute interface 187 (FIG. 12).

Therefore, the value on connection 231 should be asserted only when: (1) the register identifier of the consumer in the register stage 133 matches the register identifier of the producer in the detect exceptions stage 139, (2) the instructions in the register stage 133 and the detect exceptions stage 139 are both predicate enabled, (3) the consumer in the register stage 133 is a non-mmu instruction, and (4) the producer in the detect exceptions stage 139 is a mmu instruction. Furthermore, the value on connection 233 should be asserted only when: (1) the register identifier of the consumer in the register stage 133 matches the register identifier of the producer in the detect exceptions stage 139, (2) the instructions in the register stage 133 and the detect exceptions stage 139 are both predicate enabled, (3) the consumer in the register stage 133 is a mmu instruction, and (4) the producer in the detect exceptions stage 139 is a non-mmu instruction.

As a result, the row of compare logic 211 in hazard detection circuitry 196 detects a data hazard between the consumer in the register stage 133 and the producer in the detect exceptions stage 139 when the value on connection 231 or 233 is asserted. In this regard, the value output by OR gate 235 indicates whether or not the row of compare logic 211 detects a data hazard. When the value of the output of OR gate 235 is asserted, the row of compare logic 211 indicates that a data hazard exists between the two instructions in the register stage 133 and the detect exceptions stage 139. Conversely, when the value of the output of OR gate 235 is deasserted, the row of logic 211 indicates that no data hazard between the two instructions in the register stage 133 and the detect exceptions stage 139 is detected by the row of compare logic 211.

Figure 17:
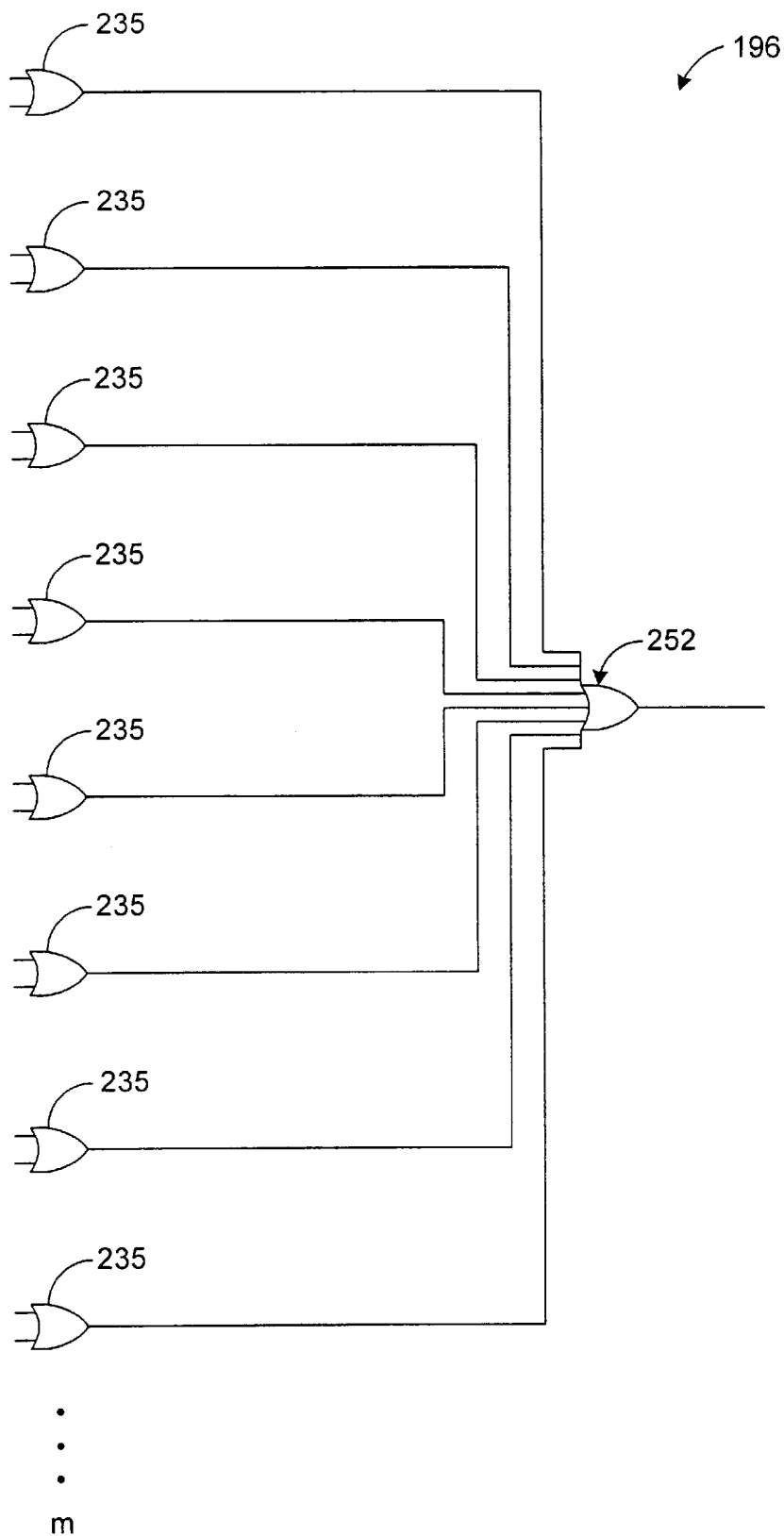
FIG. 17 is a block diagram illustrating an OR gate utilized to combine the output of each row of compare logic in the hazard detection circuitry depicted by FIG. 15.

As shown by FIG. 17, the outputs of the OR gates 235 for each row of compare logic 211 in the hazard detection circuitry 196 may be combined by an OR gate 252 such that the output of OR gate 252 indicates whether or not the hazard detection circuitry 196 detects a data hazard. When the value of the output of OR gate 252 is asserted, the hazard detection circuitry 196 indicates that a data hazard exists between the two instructions in the register stage 133 and the detect exceptions stage. Conversely, when the value of the output of OR gate 252 is deasserted, the hazard detection circuitry 196 indicates that no data hazard exists between the two instructions in the register stage 133 and the detect exceptions stage 139.

It should be noted that, as in the system 100 depicted by FIG. 6, the register identifiers and the attribute data of instructions in stages other than the register stage 133 and the detect exceptions stage 139 can be compared to detect hazards. In this regard, the configuration of the decoders 157 and 161, the attribute interfaces 185 and 189, and hazard detection logic 194 and 198 may be respectively similar to the configurations of decoders 155 and 159, the attribute interfaces 183 and 187, the hazard detection logic 196. Furthermore, similar to the comparison logic 144, the comparison logic 191 may compare the register identifier and attribute data of an instruction in one pipeline 132 to the register identifier and attribute data of another instruction in another pipeline 132 to detect data hazards according to the present invention.

Furthermore, it should be apparent to one skilled in the art that modifications may be made to the circuitry depicted by FIG. 12 without departing from the principles of the present invention. For example, only one bit of attribute data, such as the bit indicating the predicate status or the bit indicating the instruction type, may be transmitted to attribute interfaces 183, 185, 187, and 189 and used to precisely detect data hazards. In this regard, the comparison circuitry 191 may be configured to detect a data hazard only when the register identifiers of the two instructions match and when both instructions are enabled, or the comparison circuitry 191 may be configured to detect a data hazard based on the register identifiers and the types of the two instructions.

In addition, different types of instructions can be indicated by the attribute data transmitted from the pipeline 132 to the attribute interfaces 183, 185, 187, and 189, and a different number of bit values may be transmitted to represent the register identifiers, the predicate status, and/or the attribute information. In particular, types of instructions in addition to or other than the types of instructions discussed herein may define data hazards, and the attribute data of any of the stages 133, 136, 139, and/or 142 may indicate different types of instructions. The sets of attribute data respectively transmitted to each of the attribute interfaces 183, 185, 187, and/or 189 may be one or more bits of information. Furthermore, the configuration of the circuitry of the attribute interfaces 183, 185, 187, and/or 189 and the hazard detection circuitry 194, 196, and/or 198, in particular, may need to be modified to indicate data hazards between other types of instructions.

Furthermore, the types of instructions that may create a data hazard may change from stage-to-stage. Therefore, the types of instructions indicated by the attribute data transmitted to each of the attribute interfaces 183, 185, 187, and/or 189 may be different. For example, two types of instructions, when in the write stage 142, may create a data hazard with an instruction of a particular type in the register stage 133. As a result, the attribute interface 189 may receive three bits of attribute data: one bit indicating the predicate status of the instruction in the write stage 142 and the other two bits indicating whether the instruction is of the two types of instructions that may define a data hazard with the instruction in the register stage 133. This data may then be analyzed according to the principles of the present invention to detect a data hazard. By only transmitting attribute data from each stage 133, 136, 139, and/or 142 indicative of the type or types of instructions in each stage 133, 136, 139, and/or 142 that may define a data hazard with another type of instruction in another stage 133, 136, 139, and/or 142, the amount of circuitry for implementing the present invention can be minimized.

In addition, it is possible to incorporate the attribute interfaces 183, 185, 187, and 189 into the conventional system 15 depicted by FIGS. 2 and/or 3, if desired, to enable comparison circuitry 22 and/or 24 to detect data hazards based on attribute information as well as register identifiers.

It should be further noted that the principles of the present invention may be utilized to detect write-after-write (WAW) hazards. A WAW hazard exists: (1) when an earlier instruction and a later instruction both write to the same register and (2) before the earlier instruction actually writes to the register. Similar to detecting data dependency hazards, a WAW hazard can be detected by determining whether two write instructions include the same register identifiers. Therefore, the circuitry described hereinbefore can be utilized to detect when two write instructions utilize the same register. Then, additional circuitry can be used to determine whether data from the earlier instruction has been written to the register. The aforementioned information can then be used to determine whether a WAW hazard exists.

Coalescing of Attribute Data

To maximize efficiency of the system 100 and to reduce the number of wires required to implement the system 100, the data produced by attribute interfaces 183, 185, 187, and/or 189 may be coalesced, similar to the data produced by decoders 155, 157, 159, and/or 161 in FIG. 9. To illustrate these principles, refer to FIG. 18, which depicts exemplary circuitry that may be used to coalesce data that includes attribute data and that is utilized to detect data hazards.

For illustrative purposes, assume that a data hazard may exist between a consumer in the register stage 133 and a producer in one of the stages 136, 139, or 142 only if: 1) the consumer has the same register identifier as the producer, 2) both the consumer and the producer are predicate enabled, and 3) the types of the consumer and the producer are such that a data hazard may exist between the two instructions. For illustrative purposes, assume that condition 3 is satisfied only if: (a) the consumer is a non-mmu instruction and the producer is a mmu instruction when the producer is in the execution stage 136, the detect exceptions stage 139, or the write stage 142, (b) the consumer is a mmu instruction and the producer is a non-mmu instruction when the producer is in the execution stage 136, the detect exceptions stage 139, or the write stage 142, or (c) the consumer is a non-mmu instruction and the producer is an arithmetic logic unit (ALU) instruction when the producer is in the execution stage 136. However, it should be apparent to one skilled in the art that other types and/or other combinations of instruction types may satisfy condition 3, requiring modification of the circuitry used to implement the aforementioned embodiment of the present invention, which is described in more detail hereinafter.

To detect data hazards in view of the foregoing assumptions, an attribute interface 212 is configured identical to attribute interface 183 of FIG. 12 and, therefore, includes m rows of interface logic 204, as shown by FIG. 13. Each row of interface logic 204 in attribute interface 212 corresponds to a different one of the registers 37 and produces a two bit output. None of the bits output by a row of interface logic 204 are asserted if the consumer in the register stage 133 is not predicate enabled or if the register identifier of the consumer does not identify the register 37 corresponding to the row of interface logic 204. Furthermore, one of the bits output by the row of interface logic 204 is asserted only if the consumer in the register stage 133 is a mmu instruction, and the other bit is asserted only if the consumer is a non-mmu instruction. As a result, the value input into the hazard detection circuitry 196 from the attribute interface 212 should be the same value that would be produced by the attribute interface 183 in FIG. 12.

Furthermore, the attribute interfaces 216 and 218 are configured identical to the attribute interface 187 of FIG. 12. Therefore, similar to the output of the attribute interface 212, each of the attribute interfaces 216 and 218 includes m rows of interface logic 204, as shown by FIG. 13. Each row of interface logic 204 in attribute interface 216 corresponds to a different one of the registers 37 and produces a two bit output. In addition, each row of interface logic 204 in attribute interface 218 corresponds to a different one of the registers 37 and produces a two bit output. None of the bits output by a row of interface logic 204 in attribute interface 216 are asserted if the producer in the detect exceptions stage 139 is not predicate enabled or if the register identifier of the producer does not identify the register 37 corresponding to the row of interface logic 204. Similarly, none of the bits output by a row of interface logic 204 in attribute interface 218 are asserted if the producer in the write stage 142 is not predicate enabled or if the register identifier of the producer does not identify the register 37 corresponding to the row of interface logic 204.

Furthermore, one of the bits output by the row of interface logic 204 in attribute interface 216 is asserted only if the producer in the detect exceptions stage 139 is a mmu instruction, and the other bit is asserted only if the producer is a non-mmu instruction. Additionally, one of the bits output by the row of interface logic 204 in attribute interface 218 is asserted only if the producer in the write stage 142 is a mmu instruction, and the other bit is asserted only if the producer is a non-mmu instruction. As a result, the values input into the coalescing logic 223 from the attribute interfaces 216 and 218 indicate whether the instructions in the stages 139 and 142 (1) identify a particular register 37, (2) are predicate enabled, and (3) are mmu or non-mmu instructions.

The attribute interface 214, unlike attribute interfaces 212, 216, and 218, receives three bits of attribute data from its respective latch 147. Two of these bits, similar to the attribute bits received by attribute interfaces 212, 216, and 218, indicate whether the instruction in the execution stage 136 is predicate enabled and whether the instruction in the execution stage 136 is a mmu instruction. In this regard, one of the bits is asserted when the instruction in the execution stage 136 is predicate enabled, and the other bit is asserted when the instruction in the execution stage 136 is a mmu instruction. The third bit received by attribute interface 214, when asserted, indicates that the instruction in the execution stage 136 is an ALU instruction.

Figure 19:
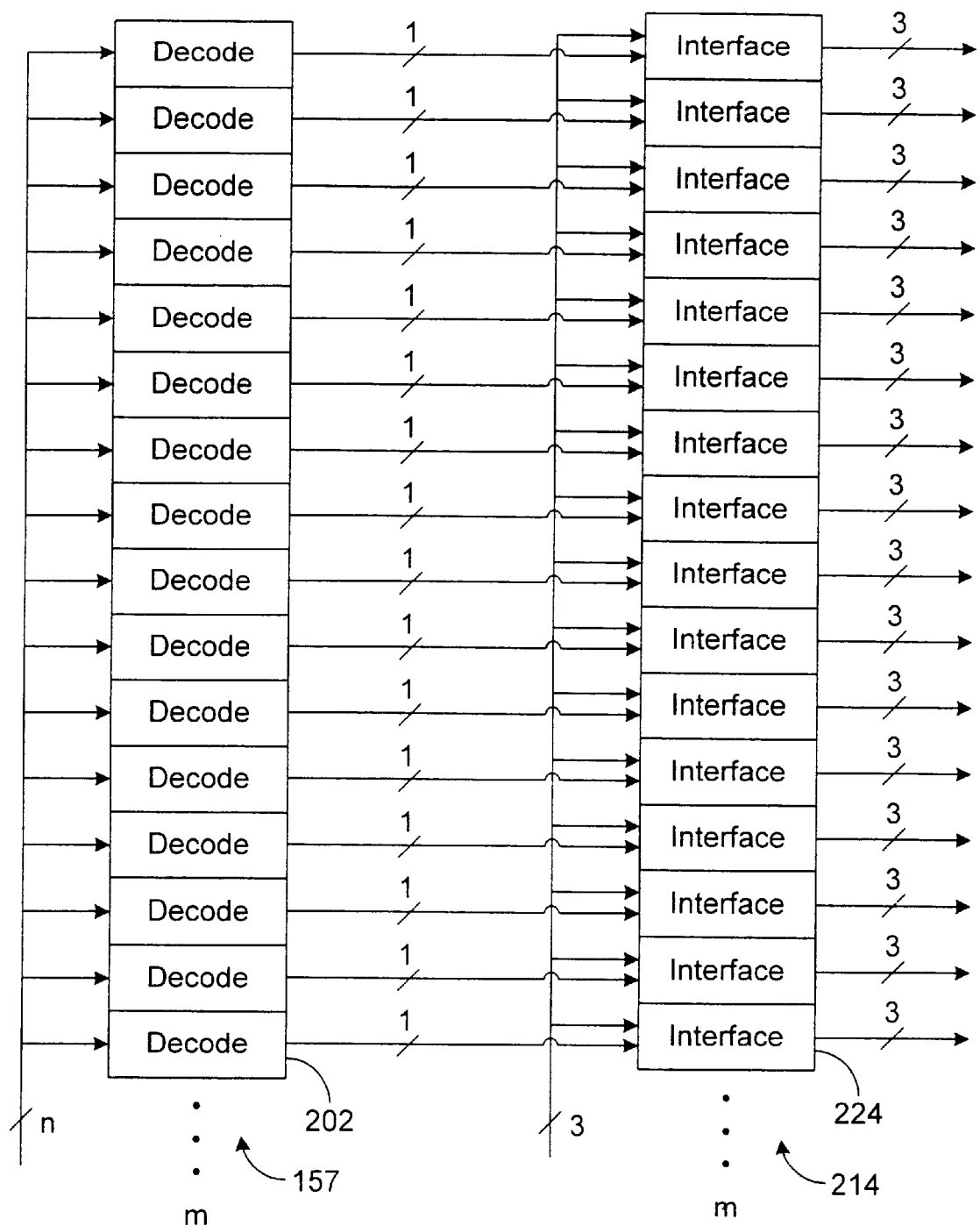
FIG. 19 is a block diagram illustrating a more detailed view of an attribute interface depicted in FIG. 18.

As shown by FIG. 19, the attribute interface 214 includes m rows of interface logic 224. Each row of interface logic 224 corresponds to a different one of the registers 37 and produces a three bit output. None of the bits output by a row of interface logic 224 are asserted if the producer in the execution stage 136 is not predicate enabled or if the register identifier of the producer does not identify the register 37 corresponding to the row of interface logic 224. Furthermore, one of the bits output by the row of interface logic 204 is asserted only if the producer in the execution stage 136 is a mmu instruction, and another of the bits is asserted only if the producer is a non-mmu instruction. The last bit is asserted only if the producer is an ALU instruction. As a result, the value input into the coalescing logic 223 from the attribute interface 214 indicates whether the instruction in the execution stage 136 (1) identifies a particular register 37, (2) is predicate enabled, (3) is a mmu, a non-mmu, or an ALU instruction.

Figure 20:
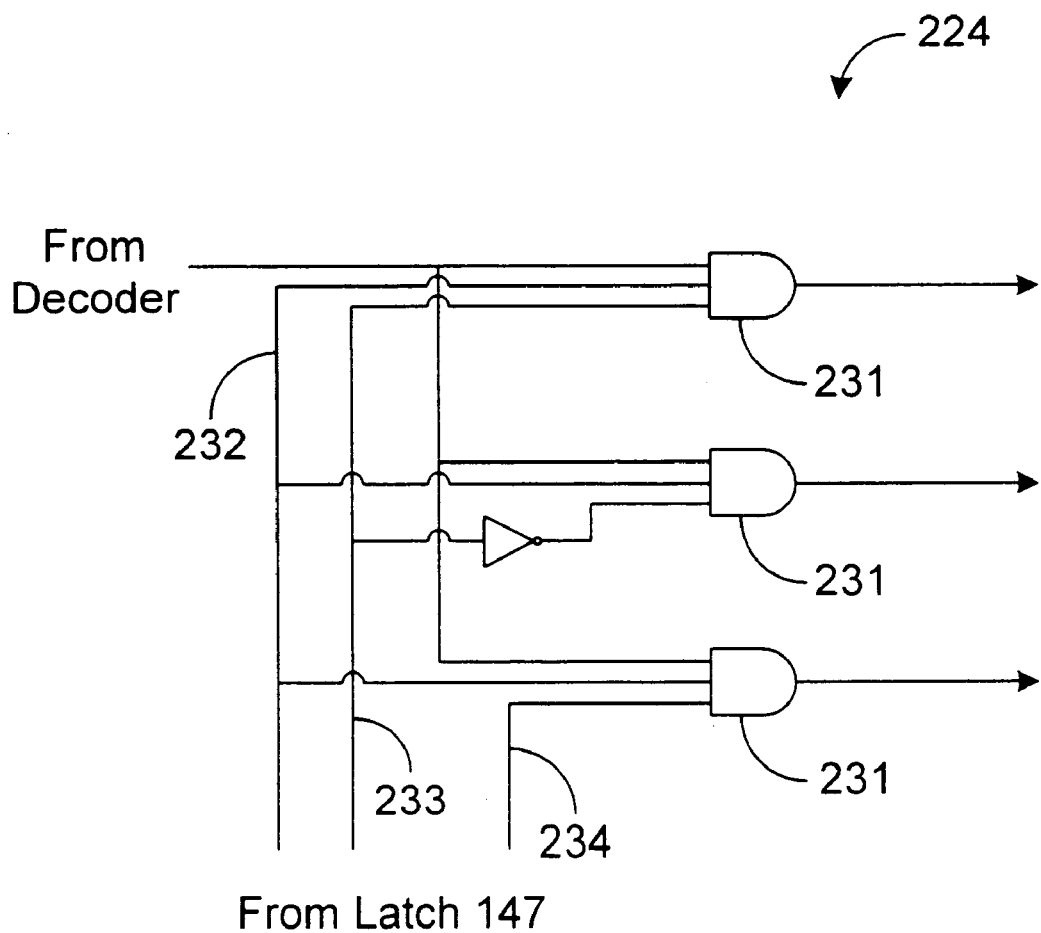
FIG. 20 is a block diagram illustrating a more detailed view of a row of interface logic depicted in FIG. 19.

FIG. 20 depicts exemplary circuitry that may be used to implement a row of interface logic 224. In this regard, each AND gate 231 receives a bit from decoder 157 and receives one of the bits of attribute data from latch 147 via connection 232. The bit from decoder 157 is asserted when the row of interface logic 224 corresponds to the register 37 identified by the register identifier received and decoded by decoder 157. Furthermore, the foregoing bit of attribute data received by each AND gate 231, via connection 232, is asserted if the instruction in the execution stage 136 is predicate enabled. One of the AND gates 231 also receives, via connection 233, the bit of attribute data that is indicative of whether the instruction in the execution stage 139 is a mmu instruction. Another of the AND gates 231 also receives the inverse of the foregoing bit of attribute data, and the remaining AND gate 231 also receives, via connection 234, the bit of attribute data that is indicative of whether the instruction in the execution stage 136 is an ALU instruction.

Figure 21:
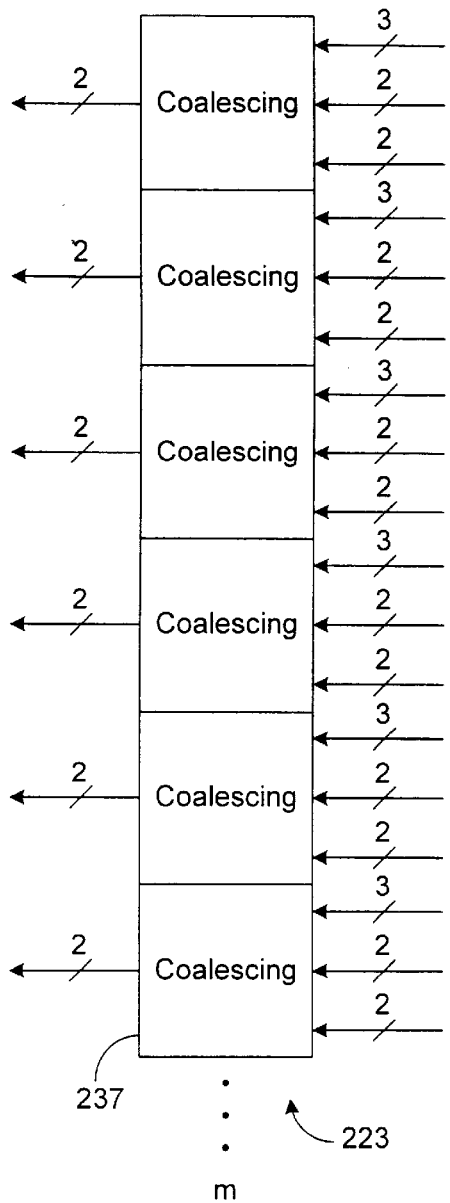
FIG. 21 is a block diagram illustrating a more detailed view of the coalescing circuitry depicted in FIG. 18.

As shown by FIG. 21, the coalescing logic 223 that receives the outputs of attribute interfaces 214, 216, and 218 includes m rows of coalescing logic 237, which correspond respectively to the registers 37. Each of the rows of coalescing logic 237 is coupled to and receives the output from a row of interface logic 224 in attribute interface 214, a row of interface logic 204 in attribute interface 216, and a row of interface logic 204 in attribute interface 218. Furthermore, the rows of interface logic 204 and 224 coupled to the same row of coalescing logic 237 correspond to the same register 37 as the row of coalescing logic 237. Therefore, a row of interface logic 237 may receive asserted output from two attribute interfaces 214, 216, or 218 only when the instructions in the stages 136, 139, or 142 associated with and coupled to the two attribute interfaces 214, 216, or 218 have matching register identifiers and are both predicate enabled.

Figure 22:
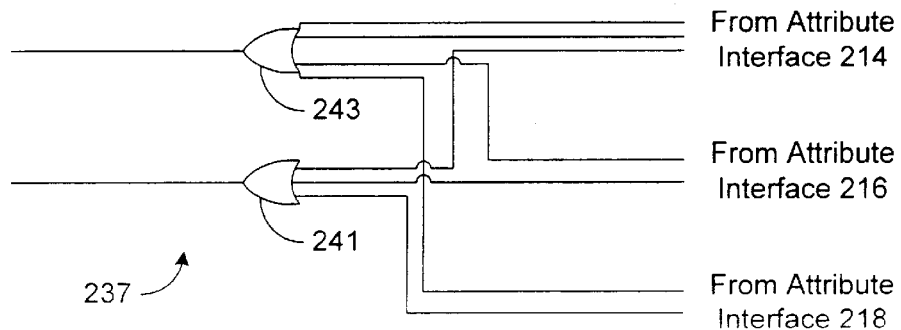
FIG. 22 is a block diagram illustrating a more detailed view of a row of coalescing logic depicted in FIG. 21.

As shown by FIG. 22, each row of coalescing logic 237 includes OR gates, such as OR gates 241 and 243, that combine the bit values received by coalescing logic 223. OR gate 241 receives each bit from attribute interfaces 214, 216, and 218 that, when asserted, indicates that a data hazard exists when the instruction in the register stage 133 is of a first type, and OR gate 243 receives each bit from attribute interfaces 214, 216, and 218 that, when asserted, indicates that a data hazard exists when the instruction in the register stage 133 is of a second type.

For example, as previously set forth, a mmu producer in any of the stages 136, 139, or 142 may define a data hazard with a non-mmu consumer in the register stage 133. Therefore, in the embodiment depicted by FIG. 22, OR gate 241 preferably receives each bit value from the corresponding rows of interface logic 204 and 224 in attribute interfaces 214, 216, and 218 (i.e., the rows of interface logic 204 and 224 in attribute interfaces 214, 216, and 218 that are coupled to the row of coalescing logic 237 depicted by FIG. 22) that is indicative of whether the instruction in the stage 136, 139, or 142 is a mmu instruction. As a result, the output of OR gate 241 is asserted when one of the producers in the stages 136, 139, or 142 (1) is associated with a register identifier identifying the register 37 corresponding to the row of coalescing logic 237, (2) is predicate enabled, and (3) is a mmu instruction.

Furthermore, as previously set forth, a non-mmu producer in any of the stages 136, 139, or 142 or an ALU producer in the execution stage 136 may define a data hazard with a mmu consumer in the register stage 133. Therefore, in the embodiment depicted by FIG. 22, OR gate 243 preferably receives each bit value from the corresponding rows of interface logic 204 and 224 in attribute interfaces 214, 216, and 218 (i.e., the rows of interface logic 204 and 224 in attribute interfaces 214, 216, and 218 that are coupled to the row of coalescing logic 237 depicted by FIG. 22) that is indicative of whether the instruction in the stage 136, 139, or 142 is a non-mmu instruction and receives the bit from the corresponding row of interface logic 224 in attribute interface 214 indicative of whether the instruction in the execution stage 136 is an ALU instruction. As a result, the output of OR gate 243 is asserted (1) when one of the instructions in the stages 136, 139, or 142 (a) is associated with a register identifier identifying the register 37 corresponding to the row of coalescing logic 237, (b) is predicate enabled, and (c) is a non-mmu instruction or (2) when the instruction in the execution stage 136 (a) is associated with a register identifier identifying the register 37 corresponding to the row of coalescing logic 237, (b) is predicate enabled, and (c) is an ALU instruction.

Figure 18:
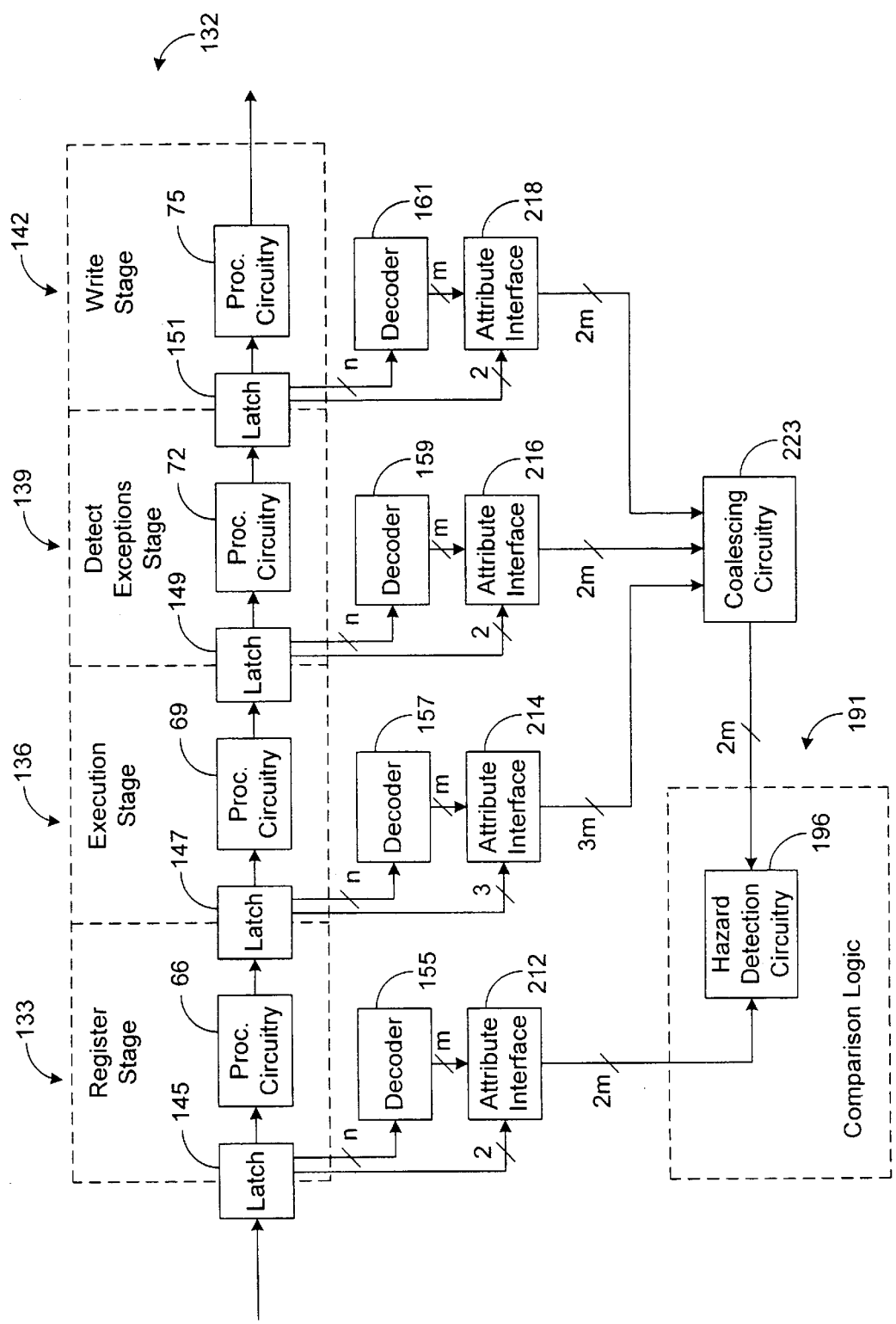
FIG. 18 is a block diagram illustrating coalescing circuitry that may be used to coalesce the data communicated between the pipeline and the comparison logic of FIG. 12.

Therefore, the hazard detection circuitry 196 depicted by FIGS. 15 and 18 may be used to receive the outputs of attribute interface 212 and coalescing circuitry 223 and to detect data hazards based on the foregoing outputs. In this regard, the hazard detection circuitry 196 includes m rows of compare logic 211 that respectively correspond to the registers 37. Each row of compare logic 211 receives output from a row of interface logic 204 in attribute interface 212 that corresponds to the same register 37 as the row of compare logic 211 and receives output from a row of coalescing logic 237 that corresponds to the same register 37 as the row of compare logic 211. Therefore, a single row of compare logic 211 may receive asserted output from both the attribute interface 212 and the coalescing circuitry 223 only when the register identifier of a predicate enabled instruction in the register stage 133 matches the register identifier of a predicate enabled instruction in one of the stages 136, 139, or 142.

Furthermore, the signal on connection 221 (FIG. 16) should be asserted only when a consumer in the register stage 133 (1) has a register identifier identifying the register 37 corresponding to the row of compare logic 211, (2) is predicate enabled, and (3) is a mmu instruction. The signal on connection 227, which is coupled to OR gate 243 (FIG. 22), should be asserted only when a producer in one of the stages 136, 139, or 142 (1) has a register identifier identifying the register 37 corresponding to the row of compare logic 211, (2) is predicate enabled, and (3) is a non-mmu instruction or an ALU instruction.

The signal on connection 223 (FIG. 16) should be asserted only when a consumer in the register stage 133 (1) has a register identifier identifying the register 37 corresponding to the row of compare logic 211, (2) is predicate enabled, and (3) is a non-mmu instruction. In addition, the signal on connection 229, which is coupled to OR gate 241 (FIG. 22), should be asserted only when a producer in stages 136, 139, or 142 (1) has a register identifier identifying the register 37 corresponding to the row of compare logic 211, (2) is predicate enabled, and (3) is a mmu instruction. Accordingly, one of the signals on connection 231 or 233 should be asserted only when a data hazard exists between two of the instructions being processed by the system 100. One of these two instructions is the consumer in the register stage 133 having a register identifier identifying the register 37 corresponding to the foregoing row of compare logic 211. This consumer may need to be stalled to prevent a data error.

By coalescing the data produced by decoders 155, 157, 159 and/or 161 (FIG. 9) and/or by attribute interfaces 212, 214, 216, and/or 218 (FIG. 18) before inputting the data into comparison logic 144 and/or 191, the number of compares by the comparison logic 144 and/or 191 to detect data hazards can be reduced. Therefore, the circuitry and complexity required to detect data hazards for a large number of pipelines 132 and/or register identifiers can be significantly reduced.

Furthermore, to further reduce the circuitry and complexity of detecting data hazards, it is possible for the coalescing circuitry 177, 179, and/or 223 (FIGS. 9 and 18) to be implemented by "wide or" structures, such as a "wired or" structure, for example. A "wide or" structure is a well known structure that ORs a large number of input signals into a smaller number of output signals via a minimal amount of circuitry and complexity. Therefore, utilizing a "wide or" structure to coalesce the data produced by decoders 155, 157, 159 and/or 161 (FIG. 9) and/or by attribute interfaces 212, 214, 216, and/or 218 (FIG. 18) can minimize the amount of circuitry required to detect data hazards associated with the processing system 100.

It should be noted that FIG. 18 only shows circuitry for comparing register identifiers and attribute data between instructions of the same pipeline 132. However, similar to the embodiment shown by FIG. 9, the data transmitted to the coalescing logic 223 and the hazard detection circuitry 196 in FIG. 18 can be transmitted from any of the pipelines 132 without departing from the principles of the present invention. In fact, it is preferable for each of the pipelines 132 to similarly transmit data to the coalescing logic 223 and/or the hazard detection circuitry 196 so that each of the data hazards associated with the system 100 can be detected by the hazard detection circuitry 196. However, the hazard detection circuitry 196 and/or the coalescing logic 223 may have to be modified from the embodiments depicted herein to accommodate the additional connections required to transmit data from different pipelines 132 to the coalescing logic 223 and/or the hazard detection circuitry 196. In addition, coalescing logic, similar to coalescing logic 177 in FIG. 9, may need to be implemented to coalesce the data transmitted from the register stage 133 of the different pipelines 132.

It should be emphasized that the above-described embodiments of the present invention, particularly, any "preferred"

embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore the following is claimed:

1. A superscalar processing system, comprising:

a plurality of pipelines configured to process instructions of a computer program;

coalescing circuitry configured to receive, from said pipelines, a plurality of register identifiers identifying a plurality of registers, said coalescing circuitry configured to coalesce said register identifiers thereby generating a coalesced register identifier identifying each of said plurality of registers; and hazard detection circuitry configured to receive said coalesced register identifier and to perform a comparison of said coalesced register identifier with other information received from said pipelines, said hazard detection circuitry further configured to detect a data hazard based on said comparison.

2. The system of claim 1, further comprising:

a plurality of decoders coupled to said pipelines, each of said decoders configured to respectively receive one of said plurality of register identifiers in encoded form and to decode said one encoded register identifier, wherein said coalescing circuitry is coupled to said pipelines via said decoders.

3. The system of claim 1, further comprising:

an attribute interface configured to receive attribute data associated with a register identifier received from said pipelines, said attribute interface further configured to make a determination, based on said attribute data, as to whether a data hazard may be correlated with said associated register identifier, said attribute interface further configured to control, based on said determination, whether said coalesced register identifier identifies a register that is identified by said associated register identifier.

4. The system of claim 3, wherein said attribute data is indicative of a type of one of said instructions.

5. The system of claim 3, wherein said attribute data is indicative of a predicate status of one of said instructions.

6. A superscalar processing system, comprising:

means for processing said instructions;

means for receiving from said processing means a first register identifier associated with one of said instructions and identifying one of a plurality of registers;

means for receiving from said processing means a second register identifier associated with another of said instructions and identifying another of said plurality of registers;

means for coalescing said first register identifier and said second register identifier to produce a third register identifier, said third register identifier identifying each of said registers identified by said first and second register identifiers;

means for comparing said third register identifier to another register identifier associated with at least one of said instructions; and means for detecting a data hazard based on said comparing means.

7. The system of claim 6, wherein each of said receiving means includes a means for decoding said register identifier received by said each receiving means.

8. The system of claim 6, further comprising:

means for receiving attribute data associated with a register identifier received from said processing means;

means for determining, based on said attribute data, whether a data hazard may be correlated with said associated register identifier; and means for controlling, based on said determining means, whether said third register identifier identifies a register that is identified by said associated register identifier.

9. The system of claim 8, wherein said attribute data is indicative of a type of one of said instructions.

10. The system of claim 8, wherein said attribute data is indicative of a predicate status of one of said instructions.

11. A superscalar processing method, comprising the steps of:

simultaneously processing instructions of a computer program;

receiving a plurality of register identifiers associated with said instructions, said register identifiers identifying a plurality of registers;

coalescing said register identifiers thereby generating a coalesced register identifier identifying each of said plurality of registers;

comparing said coalesced register identifier to another register identifier identifying at least one register; and detecting a data hazard based on said comparing step.

12. The method of claim 11, further comprising the steps of:

receiving attribute data associated with another register identifier;

determining, based on said attribute data, whether a data hazard may be correlated with said other register identifier; and controlling, based on said determining step, whether said coalesced register identifier identifies a register that is identified by said other register identifier.

13. The method of claim 12, wherein said attribute data is indicative of a type of one of said instructions.

14. The method of claim 12, wherein said attribute data is indicative of a predicate status of one of said instructions.

* * * * *